United States Patent
Chi et al.

(10) Patent No.: US 9,181,905 B2
(45) Date of Patent: Nov. 10, 2015

(54) SYSTEM FOR CONTROLLING AN AIR HANDLING SYSTEM INCLUDING AN ELECTRIC PUMP-ASSISTED EXHAUST GAS RECIRCULATION

(75) Inventors: John N. Chi, Dubuque, IA (US); John M. Mulloy, Columbus, IN (US); Sriram S. Popuri, Greenwood, IN (US); Timothy R. Frazier, Columbus, IN (US); Martin T. Books, Columbus, IN (US); Divakar Rajamohan, Columbus, IN (US); Indranil Brahma, Bloomington, IN (US)

(73) Assignee: Cummins Inc., Columbus, IN (US)

( * ) Notice: Subject to any disclaimer, the term of this patent is extended or adjusted under 35 U.S.C. 154(b) by 619 days.

(21) Appl. No.: 13/244,554

(22) Filed: Sep. 25, 2011

(65) Prior Publication Data

US 2013/0080034 A1 Mar. 28, 2013

(51) Int. Cl.
*F02M 25/07* (2006.01)
*F02D 41/00* (2006.01)
*F02D 41/14* (2006.01)

(52) U.S. Cl.
CPC ......... *F02M 25/0739* (2013.01); *F02D 41/005* (2013.01); *F02D 41/0007* (2013.01); *F02D 41/0065* (2013.01); *F02D 41/1401* (2013.01); *F02D 41/145* (2013.01); *F02D 41/1462* (2013.01); *F02D 41/1467* (2013.01); *F02D 41/1447* (2013.01); *F02D 2041/141* (2013.01); *F02D 2041/1409* (2013.01); *F02D 2041/1433* (2013.01); *F02M 25/0707* (2013.01); *Y02T 10/144* (2013.01); *Y02T 10/47* (2013.01)

(58) Field of Classification Search
CPC ............. Y02T 10/144; F02M 25/0739; F02M 25/0727; F02M 25/0707; F02M 25/0711; F02M 25/0713; F02D 29/06; F02D 41/0072

USPC ............ 123/568.11, 568.12, 568.18, 568.21, 123/568, 571, 672; 60/605.1, 605.2, 315, 60/278; 701/108
See application file for complete search history.

(56) References Cited

U.S. PATENT DOCUMENTS

| | | | | |
|---|---|---|---|---|
| 5,657,630 | A * | 8/1997 | Kjemtrup et al. | 60/605.2 |
| 5,791,146 | A * | 8/1998 | Dungner | 60/605.2 |
| 5,918,582 | A * | 7/1999 | Itoyama et al. | 123/568.29 |
| 6,138,649 | A * | 10/2000 | Khair et al. | 123/568.12 |
| 6,205,785 | B1 * | 3/2001 | Coleman | 60/605.2 |
| 6,422,219 | B1 * | 7/2002 | Savonen et al. | 123/568.12 |

(Continued)

FOREIGN PATENT DOCUMENTS

WO WO 2008087153 A1 * 7/2008 ............... H02P 6/14

*Primary Examiner* — Erick Solis
*Assistant Examiner* — Carl Staubach
(74) *Attorney, Agent, or Firm* — Faegre Baker Daniels LLP

(57) ABSTRACT

A system controlling an air handling system for an internal combustion engine. An EGR valve in-line with an EGR passageway fluidly coupled between exhaust and intake manifolds of the engine is controllable between fully closed open positions to control a flow rate of exhaust gas through the EGR passageway. A control circuit determines a pump enable value as a function of at least one of a target engine speed and a total fueling target, determines a maximum achievable flow rate of recirculated exhaust gas through the EGR passageway with the EGR valve in the fully open position, and activates an electric gas pump to increase the flow rate of exhaust gas through the EGR passageway if the pump enable value exceeds a threshold pump enable value and a target flow rate of recirculated exhaust gas through the EGR passageway is less than the maximum achievable flow rate.

19 Claims, 12 Drawing Sheets

(56) References Cited

U.S. PATENT DOCUMENTS

| | | | |
|---|---|---|---|
| 6,435,166 B1 * | 8/2002 | Sato et al. | 123/568.12 |
| 6,837,227 B2 * | 1/2005 | Jaliwala et al. | 123/568.21 |
| 6,945,236 B2 * | 9/2005 | Nakai et al. | 123/568.12 |
| 6,955,162 B2 * | 10/2005 | Larson et al. | 123/568.11 |
| 8,522,756 B2 * | 9/2013 | Vuk et al. | 123/568.12 |
| 8,640,457 B2 * | 2/2014 | Gokhale et al. | 60/605.2 |
| 2013/0061831 A1 * | 3/2013 | Gambhir et al. | 123/568.21 |
| 2013/0074496 A1 * | 3/2013 | Chi et al. | 60/605.2 |

* cited by examiner

SYSTEM FOR CONTROLLING AN AIR HANDLING SYSTEM INCLUDING AN ELECTRIC PUMP-ASSISTED EXHAUST GAS RECIRCULATION

FIELD OF THE INVENTION

The present invention relates generally to air handling systems for internal combustion engines, and more specifically to systems for controlling such air handling systems including electric pump-assisted exhaust gas recirculation.

BACKGROUND

It is desirable to control an air handling system of an internal combustion engine, particularly during transient events, to provide for a responsive air handling system capable of responding appropriately to transient operating conditions.

SUMMARY

The present invention may comprise one or more of the features recited in the attached claims, and/or one or more of the following features and combinations thereof. An air handling system for an internal combustion engine may comprise an exhaust gas recirculation (EGR) passageway fluidly coupled between an exhaust manifold of the engine and the intake manifold of the engine, an EGR valve disposed in-line with the EGR passageway, the EGR valve controllable between fully closed and fully open positions to control a flow rate of exhaust gas through the EGR passageway from the exhaust manifold to the intake manifold, an electric gas pump increasing, when activated, the flow rate of exhaust gas through the EGR passageway, and a control circuit including a memory having instructions stored therein that are executable by the control circuit to determine a pump enable value as a function of at least one of a target engine speed and a total fueling target and to determine a maximum achievable flow rate of recirculated exhaust gas through the EGR passageway with the EGR valve in the fully open position and in the absence of activation of the electric gas pump, and to activate the electric gas pump to increase the flow rate of exhaust gas through the EGR passageway if the pump enable value exceeds a threshold pump enable value and a target flow rate of recirculated exhaust gas through the EGR passageway is less than the maximum achievable flow rate.

The system may further comprise an exhaust gas cooler disposed in-line with the EGR passageway between the exhaust manifold and the EGR valve, and the electric gas pump may be fluidly coupled to the EGR passageway between the EGR cooler and the EGR valve. The electric gas pump may have an exhaust gas inlet and an exhaust gas outlet. The system may further comprise a first fluid passageway fluidly coupled between the EGR passageway and the exhaust gas inlet of the electric gas pump, a first control valve disposed in-line with the first fluid passageway, the first control valve controllable between fully closed and fully open positions, a second fluid passageway fluidly coupled between the EGR passageway and the exhaust gas outlet of the electric pump, a second control valve disposed in-line with the second fluid passageway, the second control valve controllable between fully closed and fully open positions, and a third control valve disposed in-line with the EGR passageway between a junction of the first fluid passageway with the EGR passageway and a junction of the second fluid passageway with the EGR passageway, the third control valve controllable between fully closed and fully open positions. The instructions stored in the memory may further include instructions that are executable by the control circuit to control each of the first and second control valves to fully open positions and to control the third control valve to a fully closed position when activating the electric gas pump. The instructions stored in the memory may further include instructions that are executable by the control circuit to deactivate the electric gas pump if the pump enable value does not exceed the threshold pump enable value. The instructions stored in the memory may further include instructions that are executable by the control circuit to control each of the first and second control valves to fully closed positions and to control the third control valve to a fully open position when deactivating the electric gas pump.

Alternatively or additionally, the instructions stored in the memory may further include instructions that are executable by the control circuit to activate the electric gas pump via a PWM signal. The instructions stored in the memory may further include instructions that are executable by the control circuit to control a PWM percentage of the PWM signal to a constant percentage value.

Alternatively or additionally, the instructions stored in the memory may further include instructions that are executable by the control circuit to determine the maximum achievable flow rate of recirculated exhaust gas by determining a first maximum achievable flow rate of recirculated gas through the EGR passageway with the EGR valve in the fully open position and in the absence of activation of the electric gas pump according to a first EGR flow model, determining a second maximum achievable flow rate of recirculated gas through the EGR passageway with the EGR valve in the fully open position and in the absence of activation of the electric gas pump according to a second EGR flow model different from the first EGR flow model, determining a pressure ratio of the EGR valve, determining a critical pressure ratio value, and selecting as the maximum available flow rate of recirculated exhaust gas as the first maximum available flow rate of recirculated exhaust gas if the pressure ratio of the EGR valve does not exceed the critical pressure ratio value and otherwise selecting as the maximum available flow rate of recirculated exhaust gas as the second maximum available flow rate of recirculated exhaust gas. The instructions stored in the memory may further include instructions that are executable by the control circuit to determine the pressure ratio of the EGR as a function of a target outlet pressure of the EGR cooler and a target charge pressure, the charge being a combination of fresh air and recirculated exhaust gas supplied to the intake manifold, and the instructions stored in the memory may further include instructions stored in the memory that are executable by the control circuit to determine the first and second maximum available flow rates of recirculated exhaust gas each as a function of the target outlet pressure of the EGR cooler and a target outlet temperature of the EGR cooler.

An air handling system for an internal combustion engine may comprise an exhaust gas recirculation (EGR) passageway fluidly coupled between an exhaust manifold of the engine and the intake manifold of the engine, an EGR valve disposed in-line with the EGR passageway, the EGR valve controllable between fully closed and fully open positions to control a flow rate of exhaust gas through the EGR passageway from the exhaust manifold to the intake manifold, an electric gas pump increasing, when activated, the flow rate of exhaust gas through the EGR passageway, and a control circuit including a memory having instructions stored therein that are executable by the control circuit to determine a maximum achievable flow rate of recirculated exhaust gas through the EGR passageway with the EGR valve in the fully open position and in the absence of activation of the electric gas pump, and to activate the electric gas pump to increase the flow rate of exhaust gas through the EGR passageway if a target flow rate of recirculated exhaust gas through the EGR passageway exceeds the maximum achievable flow rate of recirculated exhaust gas through the EGR passageway.

The instructions stored in the memory may further include instructions that are executable by the control circuit to determine a pump request value as a function of the target flow rate of recirculated exhaust gas through the EGR passageway and the maximum flow rate of recirculated exhaust gas through the EGR passageway, and to activate the electric gas pump only if the target flow rate of recirculated exhaust gas through the EGR passageway is greater than the maximum achievable flow rate of recirculated exhaust gas through the EGR passageway and the pump request value exceeds a low flow threshold. The instructions stored in the memory may further include instructions that are executable by the control circuit to deactivate the electric gas pump if the pump request value does not exceed the low flow threshold.

Alternatively or additionally, the instructions stored in the memory may further include instructions that are executable by the control circuit to activate the electric gas pump via a PWM signal. The instructions stored in the memory may further include instructions that are executable by the control circuit to determine a PWM percentage value as a function of the target flow rate of recirculated exhaust gas through the EGR passageway and the maximum flow rate of recirculated exhaust gas through the EGR passageway, and to control a PWM percentage of the PWM signal to the PWM percentage value.

Alternatively or additionally, the system may further comprise an exhaust gas cooler disposed in-line with the EGR passageway between the exhaust manifold and the EGR valve, and the electric gas pump may be fluidly coupled to the EGR passageway between the EGR cooler and the EGR valve. The electric gas pump may have an exhaust gas inlet and an exhaust gas outlet. The system may further comprise a first fluid passageway fluidly coupled between the EGR passageway and the exhaust gas inlet of the electric gas pump, a first control valve disposed in-line with the first fluid passageway, the first control valve controllable between fully closed and fully open positions, a second fluid passageway fluidly coupled between the EGR passageway and the exhaust gas outlet of the electric pump, a second control valve disposed in-line with the second fluid passageway, the second control valve controllable between fully closed and fully open positions, and a third control valve disposed in-line with the EGR passageway between a junction of the first fluid passageway with the EGR passageway and a junction of the second fluid passageway with the EGR passageway, the third control valve controllable between fully closed and fully open positions. The instructions stored in the memory may further include instructions that are executable by the control circuit to control each of the first and second control valves to fully open positions and to control the third control valve to a fully closed position when activating the electric gas pump. The instructions stored in the memory may further include instructions that are executable by the control circuit to deactivate the electric gas pump if the target flow rate of recirculated exhaust gas through the EGR passageway does not exceed the maximum achievable flow rate of recirculated exhaust gas through the EGR passageway. The instructions stored in the memory may further include instructions that are executable by the control circuit to control each of the first and second control valves to fully closed positions and to control the third control valve to a fully open position when deactivating the electric gas pump.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
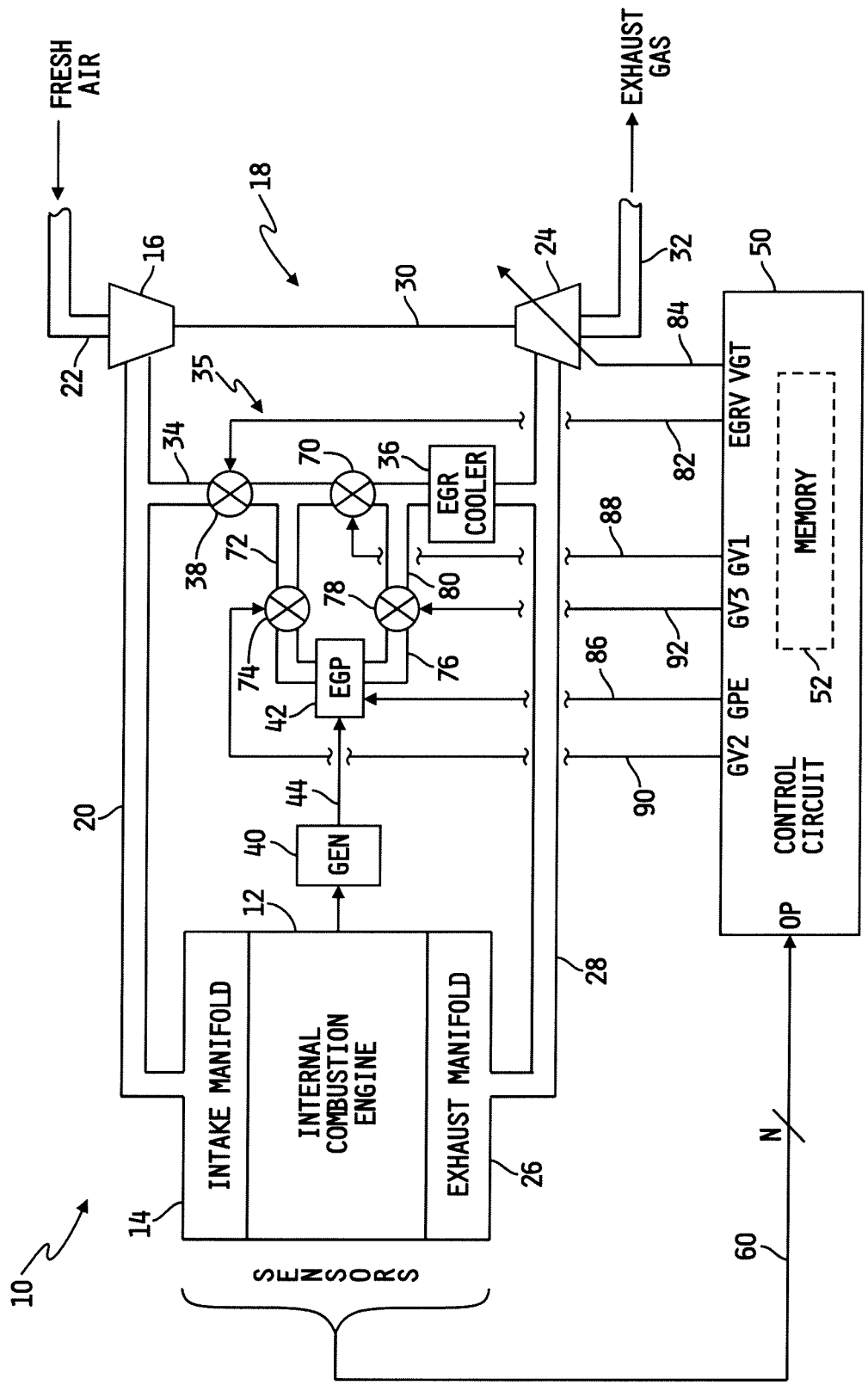
FIG. 1 is a block diagram of one illustrative embodiment of an air handling system for an internal combustion engine that includes an electric gas pump-assisted EGR system.

Referring now to FIG. 1, a block diagram is shown of one illustrative embodiment of an air handling system 10 for an internal combustion engine 12 including an electric gas pump-assisted EGR system. In the illustrated embodiment, the internal combustion engine 12 has an intake manifold 14 fluidly coupled to an outlet of a compressor 16 of a variable geometry turbocharger 18 via a fluid passageway 20. An inlet of the compressor 16 is fluidly coupled to ambient via a fluid passageway 22 such that the compressor 16 receives fresh air at its inlet via the fluid passageway 22 and supplies the fresh air, or so-called charge air, from its outlet to the intake manifold 14 via the fluid passageway 20. The compressor 16 is illustratively of a conventional design. Optionally, a charge air cooler may be disposed in-line with the fluid passageway 20, as is known in the art, to cool the charge air supplied by the compressor 16 to the intake manifold 14 in a conventional manner.

A turbine 24 of the turbocharger 18 has a fluid inlet fluidly coupled to an exhaust manifold 26 of the engine 12 via a fluid passageway 28, and a fluid outlet fluidly coupled to ambient via a fluid passageway 32. The turbine 24 is illustratively a conventional variable geometry turbocharger having a variable swallowing capacity that may be selectively controlled as indicated by the diagonal arrow passing through the turbine 24 in FIG. 1. In any case, exhaust gas produced by the engine 12 passes through the exhaust gas passageway 28 to the inlet of the turbine 24, and then passes through the outlet of the turbine 24 to ambient via the exhaust gas passageway 32 in a conventional manner.

The compressor 16 of the variable geometry turbocharger 18 includes a compressor wheel or disk (not shown) and the turbine 24 likewise includes a wheel or disk (not shown), and the wheel or disk of the compressor 16 is rotatably coupled to the wheel or disk of the turbine 24 via a rotatable shaft 30. Exhaust gas flowing through the turbine 24 causes the wheel or disk of the turbine 24 to rotate, thereby causing the shaft 30, and thus the wheel or disk of the compressor 16, to also rotate. Rotation of the wheel or disk of the compressor 16 draws additional air into the intake air passageway 20, thereby increasing the flow rate of air to the intake manifold 14 above what it would otherwise be without the turbocharger 18, and in this conventional manner the turbocharger 18 supplies so-called boost air to the engine 12.

The air handling system 10 further includes an exhaust gas recirculation (EGR) system 35 having a fluid passageway 34 fluidly coupled between the exhaust gas passageway 28 and the intake air passageway 20. An EGR cooler 36 may be disposed in-line with the EGR passageway 34 for the purpose of cooling exhaust gas flowing through the EGR passageway 34, and an EGR control valve 38 is disposed in-line with the EGR passageway 34 between the EGR cooler 36 and the intake air passageway 20. The EGR control valve 38 is illustratively a conventional valve that can be electrically controlled in a conventional manner between fully closed and fully open positions to selectively control the flow rate of exhaust gas passing from the exhaust gas passageway 28 to the intake manifold 14 via the intake air passageway 20. Intake fluid supplied to the intake manifold 14 of the engine 12 by the air handling system 10 is typically referred to as a "charge" and is understood to include fresh air, or air charge, supplied through the compressor 16 of the turbocharger 18 to the air intake passageway 20 and under some operating conditions of the engine 12 recirculated exhaust gas supplied through the EGR passageway 34 to the air intake passageway 20.

In the embodiment illustrated in FIG. 1, the EGR system 35 further includes an electric gas pump (EGP) 42 mounted to or integral with a fluid passageway 76 that is fluidly coupled at one end to an electronically controllable valve 74 and at its opposite end to another electronically controllable valve 78. The valve 74 is further fluidly coupled to the EGR passageway 34 via a fluid passageway 72, and the valve 78 is fluidly coupled to the EGR passageway 34 via a fluid passageway 80, and yet another electronically controllable valve 70 is disposed in-line with the EGR passageway 34 between the junctions of the EGR passageway 34 with the fluid passageways 72 and 76. In the illustrated embodiment, all of the foregoing structure is illustratively fluidly coupled to the EGR passageway 34 between the EGR cooler 36 and the EGR valve 38, although this disclosure contemplates embodiments in which the EGR valve 38 may be located elsewhere relative to the foregoing structure. This disclosure further contemplates embodiments that do not include an EGR cooler 36, and in such embodiments the electric gas pump 42 and associated fluid passageways and control valves may be positioned upstream or downstream of the EGR valve 38. In any case, the electric gas pump 42 is electrically connected to a generator 40 via at least one electrical signal path 44. The generator 40 is mechanically driven by the engine 12, e.g., by the crankshaft (not shown) of the engine 12, and is operable in a conventional manner to convert rotation of the crankshaft of the engine 12 to electrical energy, and to supply such electrical energy to the electric gas pump 42.

The valves 74 and 78 are normally closed and the valve 70 is normally open such that exhaust gas supplied via the exhaust gas passageway 28 to the air intake passageway 20 is controlled in a conventional manner via control of a position of the EGR valve relative to a reference position, e.g., relative to a fully closed or fully open position. The electric gas pump 42 is operable, when enabled, to be responsive to the electrical energy supplied by the generator 40 to pump exhaust gas through the fluid passageway 76. The valves 74 and 78 are, under such operating conditions, opened and the valve 70 closed such that when the electric gas pump is operable additional exhaust gas is pumped by the electric gas pump 42 from the exhaust gas passageway 28, through the EGR passageway 34, through the fluid passageway 80 and the valve 78 to the fluid passageway 76, through the electric gas pump 42 to the valve 74, and then through the fluid passageway 72 to the exhaust gas inlet of the EGR valve 38 for the purpose of selectively increasing the flow rate of exhaust gas supplied to the intake manifold 14 and thereby increasing the flow rate of charge supplied to the intake manifold 14. Operation of the electric gas pump as just described provides for the ability to very quickly increase the flow rate of charge to the intake manifold 14 and thus to the engine 12 such as during transient operating conditions of the engine 12 and air handling system 10.

In the illustrated embodiment, the air handling system 10 further includes a control circuit 50 including a memory 52 having instructions stored therein that are executable by the control circuit 50 to control operation of at least the air handling system 10, and in some embodiments the control circuit 50 is operable to also control overall operation of the engine 12. The control circuit 50 illustratively includes a conventional processor, e.g., a microprocessor, which may be programmed as illustrated and described herein to control operation of the air handling system 10 as also described herein. The control circuit 50 has a number, N, of inputs OP for receiving signals from N corresponding conventional sensors associated with the air handling system 10 and also with the engine 12 via N corresponding signal paths 60, where N may be any positive integer. The memory 52 further includes conventional instructions stored therein that are executable by the control circuit 50 to process the sensor signals produced by the N sensors to determine corresponding air handling system and/or engine operating parameters. Examples of such sensors that may be included with the air handling system 10/engine 12 and their associated operating parameters include, but are not limited to, any one or combination of a compressor inlet temperature sensor configured to produce a signal corresponding to the temperature of fresh air entering the inlet of the compressor 16, a compressor inlet pressure sensor configured to produce a signal corresponding to the pressure of air entering the inlet of the compressor 16, a compressor inlet flow rate sensor configured to produce a signal corresponding to the flow rate of fresh air entering the inlet of the compressor 16, a boost pressure sensor configured to produce a signal corresponding to charge pressure within the air intake passageway 20 and intake manifold 14, a flow rate sensor configured to produce a signal corresponding to the flow rate of fresh air supplied by the compressor 16 to the intake manifold 14 and flowing through the intake air passageway 20, an intake manifold temperature sensor configured to produce a signal corresponding to the temperature of the charge entering the engine 12 via the intake manifold 14, a speed sensor configured to produce a signal corresponding to rotational speed of the turbocharger shaft 30, a speed sensor configured to produce a signal corresponding to rotational speed of the engine 12, a differential pressure sensor configured to produce a signal corresponding to the pressure differential across the EGR valve 38 or other flow restriction disposed in-line with the EGR fluid passageway 34, a temperature sensor configured to produce a temperature signal corresponding to the temperature of recirculated exhaust gas flowing through the EGR fluid passageway 34 and/or exiting the EGR cooler 36, a pressure sensor configured to produce a signal corresponding to the pressure of exhaust gas exiting the EGR cooler 36, a flow rate sensor configured to produce a signal corresponding to the flow rate of recirculated exhaust gas flowing through the EGR passageway 34, a pressure sensor configured to produce a signal corresponding to exhaust gas pressure at the outlet of the turbine 24, an exhaust gas temperature sensor configured to produce a signal corresponding to the temperature of exhaust gas produced by the engine 12, a temperature sensor configured to produce a signal corresponding to the operating temperature of the engine 12, e.g., the temperature of engine coolant fluid circulating through the engine 12, and the like. Although such one or combination of such sensors is/are not specifically illustrated in the drawings, those skilled in the art will recognize that such one or more sensors are conventional and that various combinations of such sensors will typically be included in conventional engine and/or air handling control systems and therefore need not be specifically shown in the drawings.

In the embodiment illustrated in FIG. 1, the control circuit 50 further includes a number of outputs electrically connected to various actuators associated with the air handling system 10. For example, the control circuit 50 includes an EGR valve output, EGRV, which is electrically connected to an actuator of the EGR valve 38 via a signal path 82. The memory 52 has instructions stored therein that are executable by the control circuit 50 to control the position of the EGR valve 38 relative to a reference position, e.g., relative to a fully open or fully closed position, by controlling the actuator of the EGR valve 38 via selective control of the actuator signal, i.e., EGR valve control signal, produced on the signal path 82 to thereby control the flow rate of recirculated exhaust gas through the EGR fluid passageway 34 in a conventional manner. The control circuit 50 further includes a variable geometry turbocharger output, VGT, which is electrically connected to a conventional variable geometry actuator of the turbocharger turbine 24 via a signal path 84. The memory 52 has instructions stored therein that are executable by the control circuit 50 to selectively control the geometry of the turbine 24, i.e., the exhaust gas swallowing capacity of the turbine 24, in a conventional manner by controlling the variable geometry actuator of the turbocharger turbine 24 via selective control of a VGR control signal produced on the signal path 84.

The control circuit 50 further includes an electric gas pump enable output, GPE, which is electrically connected to an enable input of the electric gas pump 42 via a signal path 86. The memory 52 has instructions stored therein that are executable by the control circuit 50 to selectively produce an enable signal on the signal path 86 to thereby selectively enable operation of the electric gas pump 42 to rapidly increase the flow rate of exhaust gas through the EGR passageway 34. The control circuit 50 further includes a number of gas valve control outputs, GV1, GV2 and GV3, which are electrically connected to conventional valve actuators associated with the electronically controllable valves 70, 74 and 78 respectively. The memory 52 has instructions stored therein that are executable by the control circuit 50 to control the positions of the valves 70, 74 and 78 between fully open and fully closed position, by controlling the actuators of the valves 70, 74 and 78 via selective control of the actuator signals produced on the signal paths 88, 90 and 92 respectively to thereby control the flow path of exhaust gas supplied to the air intake passageway 20, the intake manifold 14 and the engine 12. When the valve 70 is open and the valves 74 and 78 are closed, for example, exhaust gas flows through the EGR passageway 34, through the valve 70, through the EGR valve 38 and then to the air intake passageway 20. When the valve 70 is closed and the valves 74 and 78 are open, exhaust gas is supplied via the valve 78 to the fluid inlet of the electric gas pump 42, and the electric gas pump 42 supplies exhaust gas with an increased flow rate to the fluid inlet of the EGR valve 38 via the gas valve 74.

The air handling system 10 may, in some embodiments, illustratively include one or more additional actuators. For example, in some embodiments the air handling system 10 may include an intake assist throttle positioned in-line with the air intake conduit 20 for the purpose of modulating fresh air flow through the engine system as described hereinabove. In some embodiments the air handling system 10 may alternatively or additionally include a turbine bypass valve fluidly coupled between the exhaust conduits 28 and 32 for the purpose of selectively diverting exhaust gas around the turbine 24 to thereby modulate the energy applied to the turbine 24 as described hereinabove. It will be understood that while such one or more additional actuators are not shown in FIG. 1, such actuators are known in the art and may be provided and implemented in the form of conventional actuators.

Figure 2:
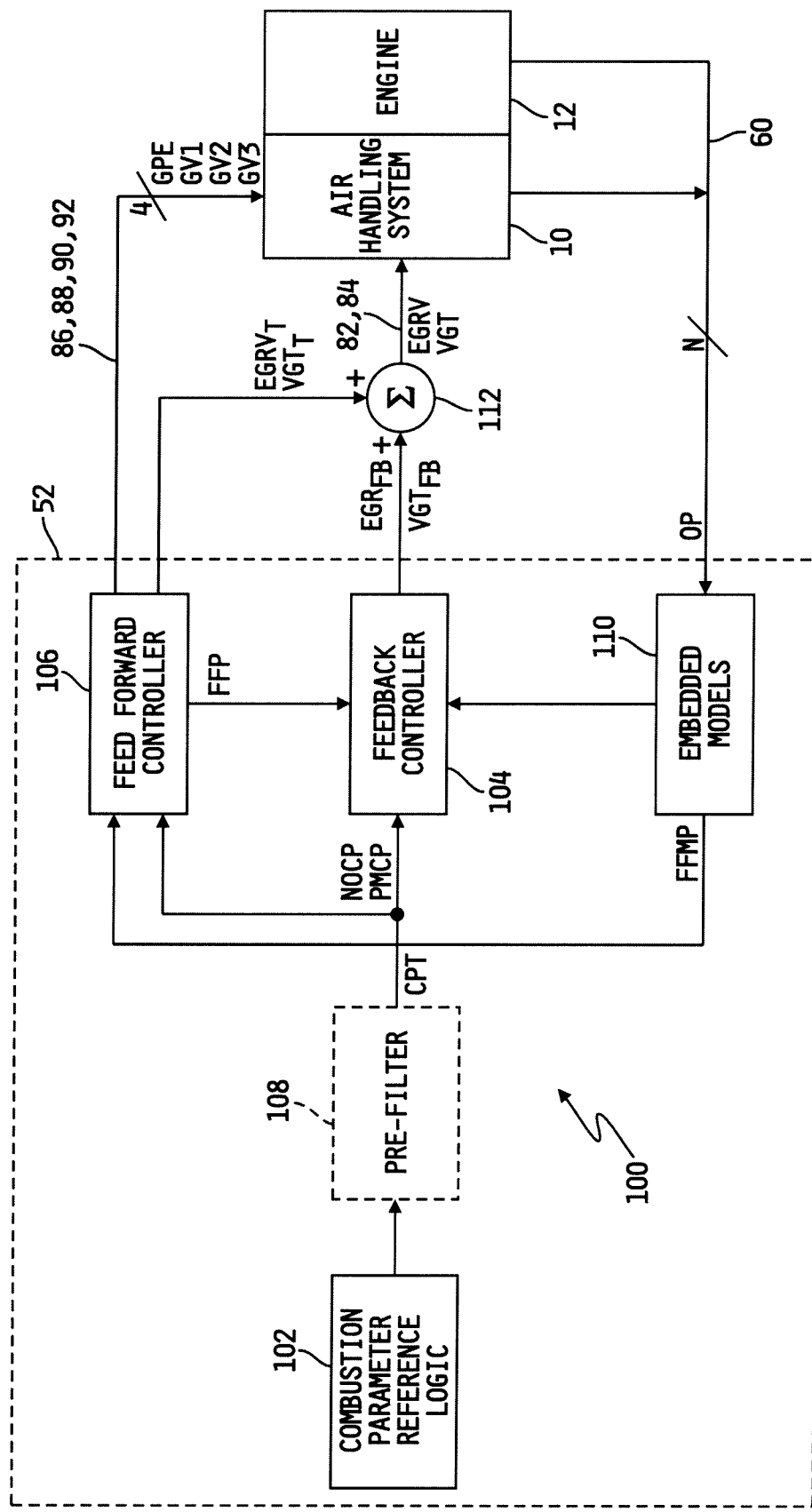
FIG. 2 is a block diagram of one illustrative embodiment of a control structure stored in the memory of the control circuit of FIG. 1 and that is executable by the control circuit to control operation of the air handling system.

Referring now to FIG. 2, one illustrative embodiment of a control structure 100 is shown for controlling the operation of the air handling system 10 illustrated in FIG. 1. The control structure 100 is illustratively stored in the memory 52 in the form of instructions that are executable by the control circuit 50 to control operation of the air handling system 10 as will be described hereinafter. In the illustrated embodiment, the control structure 100 includes a combustion parameter reference logic block 102 that produces conventional control parameter targets, CPT, in the form of, for example, at least a NOx emission control parameter, NOCP, and a particulate matter control parameter, PMCP, which are provided to a feedback controller 104 and also to a feed forward controller 106. Illustratively, NOCP and PMCP are surrogates for the NOx and particulate matter control parameters respectively, and examples of CPT generally and of NOCP and PMCP specifically, include, but are not limited to, one or any combination of recirculated exhaust gas flow rate, EGRFR, fresh air flow rate, FAF, charge flow rate, MCF, boost pressure, BOOST, oxygen content of exhaust gas (02), intake $O_2$ mole fraction and air-to-fuel ratio, AFR. Optionally, as illustrated in FIG. 2 in phantom, the control structure 100 may further include a pre-filter block 108 interposed between the combustion parameter reference logic block 102 and the feedback/feed-forward controllers 104 and 106 respectively. The pre-filter block 108, if included, is illustratively used to modify the desired reference targets, i.e., the control parameter targets, CPT, based on the system response so that the system will produce the desired reference target values.

The feedback controller 104 generally receives one or more feedforward operating parameters, FFP, from the feedforward controller 106, e.g., in the form of one or more target operating parameters. The control structure 100 further includes an embedded models block 110, and operating parameters, OP, produced by the N different sensors associated with the air handling system 10 and/or engine 12 are provided to the embedded models block via the N signal paths 60. The embedded models block 110 includes a number of mathematical models that each produce a different model parameter based on one or more of the operating parameters, OP. Examples of some of the models included in the embedded models block include, but are not limited to, EGR valve position, EGRVFB, VGT rack position, VGTFB, exhaust manifold pressure, EMPFB, modeled NOx emission parameter, NOFB (modeled NOx emission value, corresponding to NOCP, which is based on one or more measured or otherwise monitored operating parameters, OP), particulate matter parameter, PMFB (modeled particulate matter value, corresponding to PMCP, which is based on one or more measured or otherwise monitored operating parameters, OP), compressor inlet temperature, CIT, and compressor inlet pressure, CIP. The embedded models 110 provide one or more such model values in the form of one or more feedback model parameters, FBMP, to the feedback controller 104, and provide one more model values in the form of one or more feedforward model parameters, FFMP, to the feedforward controller 106. In any case, the feedback controller 104 produces a feedback component, $EGR_{FB}$ of the EGR valve control signal, EGRV, and a feedback component, $VGT_{FB}$ of the VGT control signal, VGT, and provides these values to a summation block 112. The feedforward controller 106 likewise produces a feedforward or target component, $EGRV_T$, of the EGR valve control signal, EGRV, and feedforward or target component, $VGT_T$ of the VGT control signal, VGT, and provides these values to the summation block 112. The summation block 112 combines the sum of $EGR_{FB}$ and $EGRV_T$ to produce the EGR valve control signal, EGRV on the signal path 82, and likewise combines the sum of $VGT_{FB}$ and $VGT_T$ to produce the VGT control signal, VGT, on the signal path 92. The feedforward controller 106 also selectively produces the electric gas pump enable signal, GPE, on the signal path 86 and the gas valve control signals GV1, GV2 and GV2 on the signal paths 88, 90 and 92 respectively.

Figure 3:
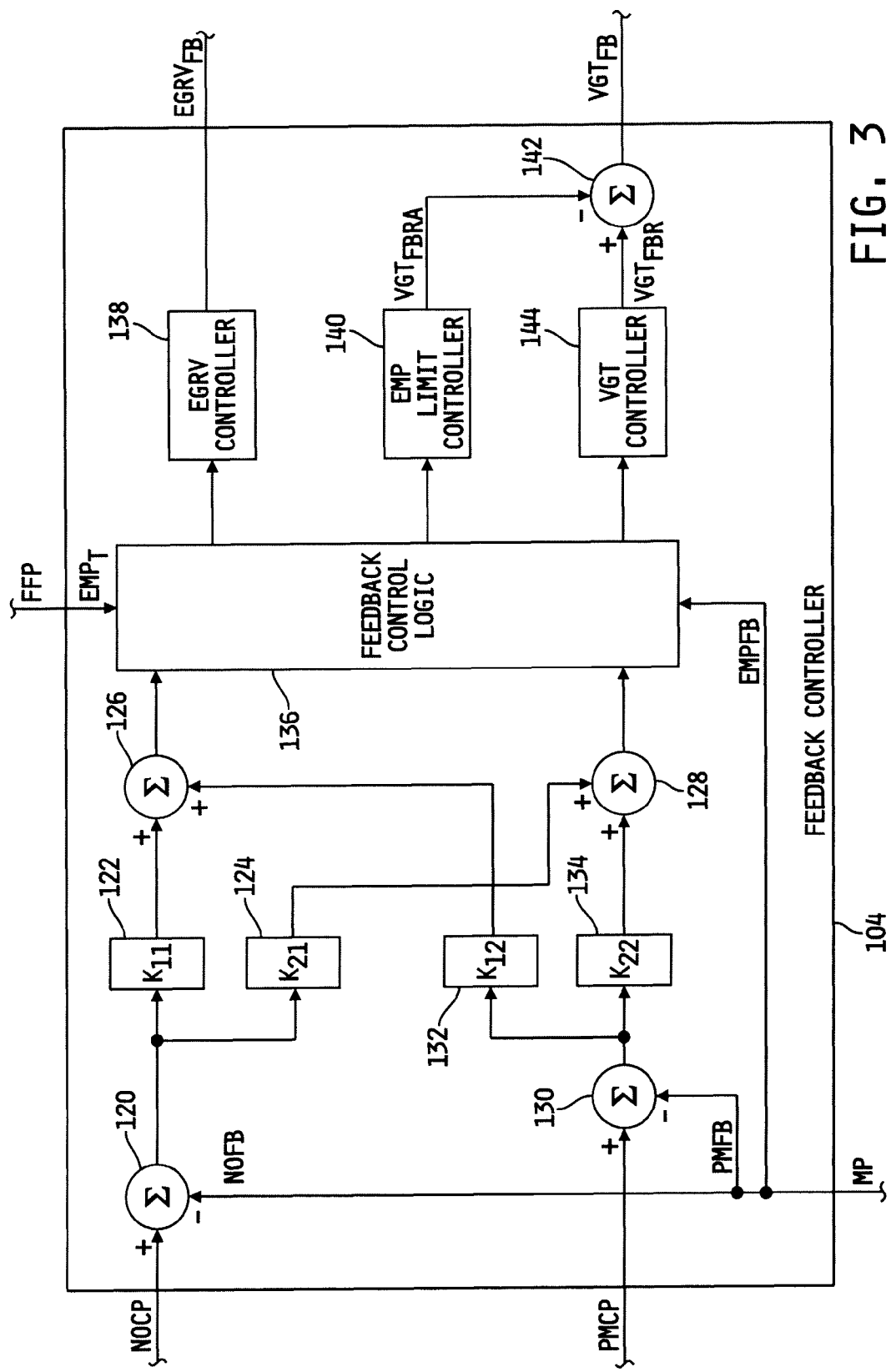
FIG. 3 is a block diagram of one illustrative embodiment of the feedback controller illustrated in FIG. 2.

Referring now to FIG. 3, one illustrative embodiment of the feedback controller 104 illustrated in FIG. 2 is shown. In the illustrated embodiment, the feedback controller 104 includes a summation node 120 having an additive input receiving the NOx emissions control parameter, NOCP, and a subtractive input receiving the modeled NOx emissions parameter, NOFB, and an output producing the value NOCP−NOFB. The output of the summation node 120 is provided to first and second weighting parameter multiplication blocks 122 and 124 respectively. The multiplication block 122 multiplies the output of the summation node 120 by a weighting parameter $K_{11}$, and the resulting value, $K_{11}*(NOCP-NOFB)$ is provided to an additive input of another summation node 126. The multiplication block 124 similarly multiplies the output of the summation node 120 by a weighting parameter $K_{21}$, and the resulting value, $K_{21}*(NOCP-NOFB)$ is provided to an additive input of yet another summation node 128. The feedback controller 104 further includes another summation node 130 having an additive input receiving the particulate matter control parameter, PMCP, and a subtractive input receiving the modeled particulate matter parameter, PMFB, and an output producing the value PMCP−PMFB. The output of the summation node 130 is provided to third and fourth weighting parameter multiplication blocks 132 and 134 respectively. The multiplication block 132 multiplies the output of the summation node 130 by a weighting parameter $K_{12}$, and the resulting value, $K_{12}*(PMCP-PMFB)$ is provided to another additive input of the summation node 126. The output of the summation node 126, $K_{11}*(NOCP-NOFB)+K_{12}*(PMCP-PMFB)$, is provided to one input of a feedback control logic block 136. The multiplication block 134 similarly multiplies the output of the summation node 130 by a weighting parameter $K_{22}$, and the resulting value, $K_{22}*(PMCP-PMFB)$ is provided to another additive input of the summation node 128. The output of the summation node 128, $K_{21}*(NOCP-NOFB)+K_{22}*(PMCP-PMFB)$, is provided to another input of the feedback control logic block 136.

In the illustrated embodiment, a single feedforward parameter, FFP, e.g., target exhaust manifold pressure, $EMP_T$, is also provided as an input to the feedback control logic block 136, as is the corresponding model parameter (FBMP) in the form of the measured or modeled exhaust manifold pressure value EMPFB. An output of the feedback control logic block 136 is provided as an input to an EGRV controller 138, the output of which is the feedback component of EGR valve control signal, $EGRV_{FB}$. Another output of the feedback control logic block 136 is provided as an input to an exhaust manifold pressure (EMP) limit controller 140, the output of which is a VGT rack position adjustment value, $VGT_{FBRA}$, and is provided to a subtractive input of a summation node 142, and yet another output of the feedback control logic block 136 is provided as an input to a VGT controller 144, the output of which is a VGT rack position value, $VGT_{FBR}$, and is provided to an additive input of the summation node 142. The output of the summation node 142 is the feedback component of the VGT control signal, $VGT_{FB}$, and represents the output of the VGT controller 144 limited by the output of the EMP limit controller 142, or $VGT_{FB}=VGT_{FBR}-VGT_{FBRA}$.

The feedback controller 104 is used in a conventional manner to reduce system performance variability by continually correcting for model errors and compensating for unknown disturbances. The feedback controller 104 illustrated in FIG. 3 is illustratively structured with generic inputs, NOCP and PMCP, and incorporates weighting compensators or parameters, $K_{11}$, $K_{12}$, $K_{21}$ and $K_{22}$ that may be calibrated such that NOCP or PMCP wins in situations where both reference targets cannot be achieved simultaneously. In the feedback controller 104 illustrated in FIG. 3, the generic air handling control spaces are represented as the NOx control parameter, NOCP and the particulate matter control parameter, PMCP. The NOx emissions control parameter, NOCP, and the modeled NOx emissions parameter, NOFB, represent the control parameter that strongly correlates with NOx emissions, and the particulate matter control parameter, PMCP, and the modeled particulate matter parameter, PMFB, represent the control parameter that strongly correlates with particulate emissions. The weighting parameters, $K_{11}$, $K_{12}$, $K_{21}$ and $K_{22}$ represent the sensitivity between the corresponding actuator command and the control variable. In one illustrative example, NOCP may be an EGR flow rate target, EGRFR, and NOFB may be the modeled or measured EGR flow rate, and PMCP may be a charge flow rate target and PMFB may be the modeled or measured charge flow rate. In this illustrative example, $K_{11}$ may represent the extent of closing the EGR valve 38 to increase boost by speeding up the rotational speed of the turbocharger 18, and $K_{21}$ may represent the extent of using the VGT to build back pressure for EGR flow. Similarly, $K_{21}$ may represent the position of the EGR valve 42 to achieve the charge flow target while $K_{22}$ may represent the position of the VGT actuator to achieve the same. The weighting compensators or parameters, $K_{11}$, $K_{12}$, $K_{21}$ and $K_{22}$, may be constants, linearly dynamic or non-linearly dynamic.

Illustratively, partial derivatives can be used to estimate the weighting factors at a given engine operation as follows:

$$K_{11} = \partial u\text{NOx}/\partial \text{NOCP}$$

$$K_{12} = \partial u\text{NOx}/\partial \text{PMCP}$$

$$K_{21} = \partial u\text{PM}/\partial \text{NOCP}$$

$$K_{22} = \partial u\text{PM}/\partial \text{PMCP},$$

where, uNOx is the NOx control actuation command, e.g., EGRV, and uPM is the particulate matter control actuation command, e.g., VGT.

The feedback control logic block 136 contains control logic for selecting the error signals to be fed to the various controllers 138, 140 and 144. In the illustrated embodiment, for example, the EGR valve control error, $E_{EGRVC}$, provided as the input to the EGRV controller 138 is set by the logic block 136 to the value of the output of the summation node 126, i.e., $E_{EGRVC} = K_{11}*(\text{NOCP}-\text{NOFB}) + K_{12}*(\text{PMCP}-\text{PMFB})$. The EGRV controller 138 is illustratively a PID controller producing the feedback component of the EGRV control signal, $\text{EGRV}_{FB}$, according to the equation $\text{EGRV}_{FB} = K_{EGRp}*E_{EGRVC} + K_{EGRi}*\int E_{EGRVC} \, dt) + K_{EGRd}*dE_{EGRVC}/dt$, where $K_{EGRp}$ is the proportional gain, $K_{EGRi}$ is the integral gain and $K_{EGRd}$ is the derivative gain. It will be understood that the EGRV controller 138 may alternatively be provided in the form of another conventional controller such as a PI controller or other known controller.

In the illustrated embodiment, the VGT control error, $E_{VGTC}$, provided as the input to the VGT controller 144 is set by the logic block 136 to the value of the output of the summation block 128, i.e., $E_{VGTC} = K_{21}*(\text{NOCP}-\text{NOFB}) + K_{22}*(\text{PMCP}-\text{PMFB})$. The VGT controller 144 is illustratively a PID controller producing a feedback component of the VGT rack position control signal, $\text{VGT}_{FBR}$, according to the equation $\text{VGT}_{FBR} = K_{VGTp}*E_{VGTC} + K_{VGTi}*\int E_{VGTC} dt) + K_{VGTd}*dE_{VGTC}/dt$, where $K_{VGTp}$ is the proportional gain, $K_{VGTi}$ is the integral gain and $K_{VGTd}$ is the derivative gain. It will be understood that the VGT controller 144 may alternatively be provided in the form of another conventional controller such as a PI controller or other known controller.

In the illustrated embodiment, the exhaust manifold pressure control error, $E_{EMPC}$, provided as the input to the EMP limit controller 140 is set by the logic block 136 to the value of the difference between the exhaust manifold pressure target, $\text{EMP}_T$ and the measured or modeled value of the exhaust manifold pressure, EMPFB, or $E_{EMPC} = \text{EMP}_T - \text{EMPFB}$. The EMP limit controller 140 is illustratively a PID controller producing a VGT rack position adjustment signal, $\text{VGT}_{FBRA}$, according to the equation $\text{VGT}_{FBRA} = K_{EMPp}*E_{EMPC} + K_{EMPi}*\int E_{EMPC} dt) + K_{EMPd}*dE_{EMPC}/dt$, where $K_{EMPp}$ is the proportional gain, $K_{EMPi}$ is the integral gain and $K_{EMPd}$ is the derivative gain. It will be understood that the EMP limit controller 140 may alternatively be provided in the form of another conventional controller such as a PI controller or other known controller. In any case, the feedback component of the VGT control signal, $\text{VGT}_{FB}$, is the difference between $\text{VGT}_{FBR}$ and $\text{VGT}_{FBRA}$, or $\text{VGT}_{FB} = \text{VGT}_{FBR} - \text{VGT}_{FBRA}$.

It will be understood that in embodiments of the air handling system 10 that include one or more additional actuators as described hereinabove, the feedback controller 104 may likewise include one or more additional controllers that receive error inputs from the feedback control logic block 136. For example, in some embodiments the air handling system 10 may include an intake assist throttle positioned in-line with the air intake conduit 20 for the purpose of modulating fresh air flow through the engine system as described hereinabove. In such embodiments, the feedback controller 104 may include an intake assist throttle feedback controller receiving an intake assist throttle controller parameter error from the logic block 136, which may be the output of the summation node 126 under some operating conditions and the output of the summation node 128 under other operating conditions, and producing a feedback component of an intake assist throttle control signal according to a PID function as described hereinabove or according to a PI or other known controller function. In some embodiments the air handling system 10 may alternatively or additionally include a turbine bypass valve fluidly coupled between the exhaust conduits 28 and 32 for the purpose of selectively diverting exhaust gas around the turbine 24 to thereby modulate the energy applied to the turbine 24 as described hereinabove. In such embodiments, the feedback controller 104 may include a turbine bypass valve feedback controller receiving a turbine bypass valve controller parameter error from the logic block 136, which may be, for example the difference between a target and measured (or modeled) turbocharger rotational speed under some operating conditions and the output of the summation node 128 under other operating conditions, and producing a feedback component of a turbine bypass valve control signal according to a PID function as described hereinabove or according to a PI or other known controller function.

Figure 4:
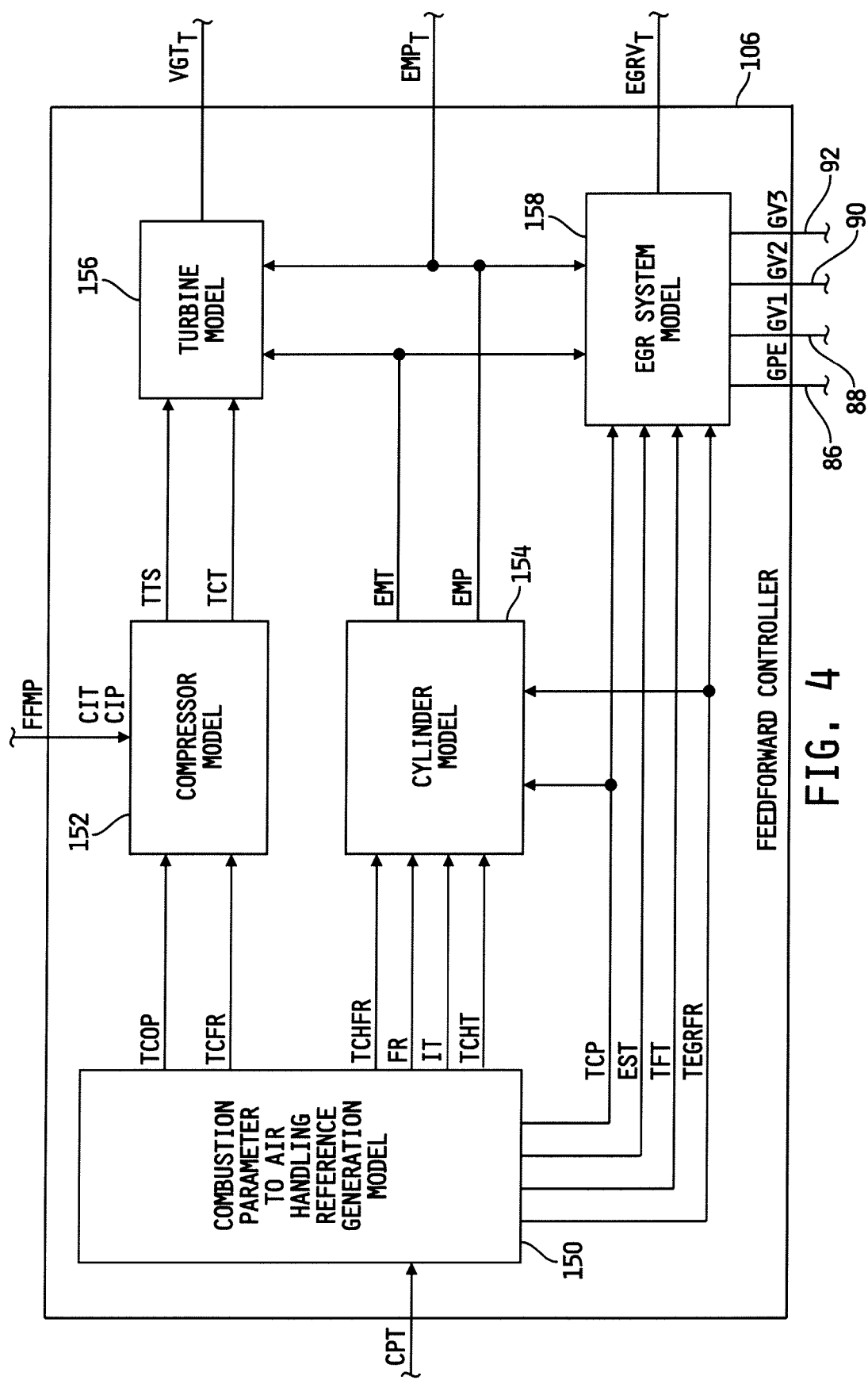
FIG. 4 is a block diagram of one illustrative embodiment of the feedforward controller illustrated in FIG. 2.

Referring now to FIG. 4, one illustrative embodiment of the feedforward controller 106 illustrated in FIG. 2 is shown. In the illustrated embodiment, the feedforward controller 106 includes a combustion parameter to air handling reference generation model 150 that receives as inputs the various control parameter targets, CPT, produced by the combustion parameter reference logic block 102 of FIG. 2. The combustion parameter to air handling reference generation model 150 includes a number of conventional equations, maps, lookup tables or the like that translate or otherwise convert combustion references included in the CPT, e.g., fresh air flow rate, charge flow rate, EGR flow rate and intake $O_2$ mole fraction, to turbocharger-machinery references or targets such as a target fresh air flow rate, TFAF, a target compressor outlet pressure, TCOP, and a target compressor flow rate, TCFR, and cylinder and manifold references or targets such as a target charge flow rate, TCHFR, a target fueling rate, FR, a total fueling target, TFT, an engine speed target, EST, a target injection timing, IT, a target charge temperature, TCHT, a target charge pressure, TCP, and a target EGR flow rate, TEGRFR. The feedforward controller 106 further includes a compressor model 152 that receives as inputs the target compressor outlet pressure, TCOP, and the target compressor flow rate, TCFR, and in the illustrated embodiment further receives as inputs from the embedded models 110 feedforward model parameters, FFMP, in the form of measured or modeled values of a compressor inlet temperature, CIT, and a compressor inlet pressure, CIP. The compressor model 152 includes an embedded model of the compressor 16 to determine a target compressor rotational speed, which is the same as the turbine rotational speed and is therefore labeled in FIG. 4 as a target turbocharger speed, TTS, and a target compressor torque, TCT. Further details relating to one illustrative embodiment of the compressor model 152 will be described hereinafter with respect to FIGS. 5-7.

The feedforward controller 106 further includes a cylinder model 154 that receives as inputs the target charge flow rate, TCHFR, a target fueling rate, FR, a target injection timing, IT, a target charge temperature, TCHT, a target charge pressure, TCP, and a target EGR flow rate, TEGRFR produced by the combustion parameter to air handling reference generation model 150. The cylinder model 154 includes a model that estimates desired (target) exhaust manifold temperature, EMT, (i.e., turbine inlet temperature) and desired (target) exhaust manifold pressure, EMP, (i.e., turbine inlet pressure) from the foregoing air handling and fuel injection references. Further details relating to one illustrative embodiment of the cylinder model 154 is described in co-pending U.S. patent application Ser. No. 13/244,550, the disclosure of which is incorporated herein by reference in its entirety.

The feedforward controller 106 further includes a turbine model 156 that receives as inputs the target turbocharger speed, TTS, and the target compressor torque, TCT, produced by the compressor model 152, as well as the target exhaust manifold temperature, EMT, and the target exhaust manifold pressure target, EMP, produced by the cylinder model 154. The turbine model 156 includes an embedded model of the turbine 24 which estimates the feedforward or target component, $VGT_T$ of the VGT control signal, VGT. Further details relating to one illustrative embodiment of the turbine model 156 will be described in detail hereinafter with respect to FIGS. 8-12.

The feedforward controller 106 further includes an EGR system model 158 that receives as inputs the target charge pressure, TCP, the Engine speed target, EST, the total fueling target, TFT, and the target EGR flow rate, TEGRFR, all produced by the combustion parameter to air handling reference generation model 150, as well as the target exhaust manifold temperature, EMT, and the target exhaust manifold pressure target, EMP, produced by the cylinder model 154. The EGR system model 158 includes an embedded model that illustratively uses conventional momentum and Bernoulli equations to determine a position of the EGR valve 38 relative to a reference position that will meet the EGR flow reference targets, and to produce a corresponding EGR valve target signal, $EGR_T$. The EGR system model 158 also produces as outputs the gas pump enable value, GPE, produced on signal path 86, and the gas valve control signals GV1, GV2 and GV3 produced on the signal paths 88, 90 and 92 respectively. The EGR system model 158 further includes embedded models that control operation of the electric gas pump 42 and the gas valves 70, 74 and 78 as will be described in greater detail hereinafter with respect to FIGS. 13-16.

Figure 5:
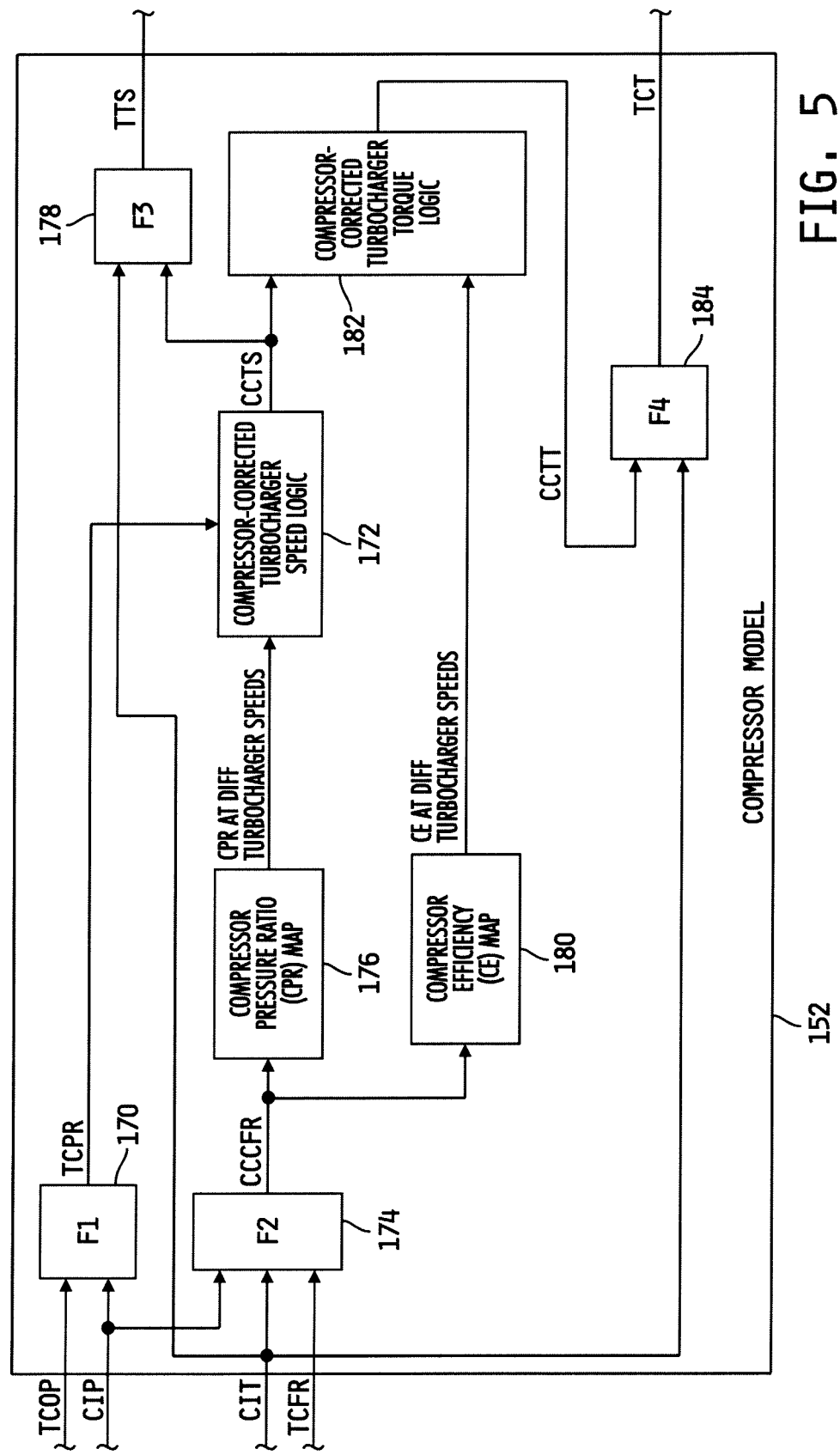
FIG. 5 is a block diagram of one illustrative embodiment of the compressor model illustrated in FIG. 4.

Referring now to FIG. 5, one illustrative embodiment of the compressor model 152 illustrated in FIG. 4 is shown. In the illustrated embodiment, the compressor model 152 includes a function block 170 receiving as inputs the target compressor outlet pressure, TCOP, and the compressor inlet pressure, CIP, and producing as an output a target compressor pressure ratio, TCPR. Illustratively, the function, F1, stored in the function block 170 produces TCPR in accordance with the equation TCPR=TCOP/CIP. The target compressor ratio, TCPR, is provided as an input to a compressor-corrected turbocharger speed logic block 172. The compressor model 152 further includes another function block 174 receiving as inputs the compressor inlet pressure, CIP, the compressor inlet temperature, CIT, and the target compressor flow rate, TCFR, and produces as an output a compressor corrected compressor flow rate CCCFR. Illustratively, the function, F2, stored in the function block 174 produces CCCFR in accordance with the equation CCCFR=TCFR*SQRT(CIT/$T_{STD}$)* (CIP/$P_{STD}$), where $T_{STD}$ is a standard reference temperature, e.g., 25 degrees C. or other reference temperature, and $P_{STD}$ is a standard reference pressure, e.g., 101.3 kPa or other reference pressure. Alternatively, this disclosure contemplates other embodiments in which F1 and/or F2 includes more, fewer and/or different input parameters.

The compressor corrected compressor flow rate, CCCFR, is provided as an input to another functional block 176 that illustratively has stored therein a conventional compressor pressure ratio map corresponding to the specific configuration of the turbocharger 18. Generally, the compressor pressure ratio map is designed to map values of CCCFR to compressor pressure ratio values at a plurality of different turbocharger operating speeds. The functional block 176 is illustratively operable to process CCCFR using the compressor pressure map to generate a number of pairs of compressor pressure ratio and turbocharger operating speed values.

Figure 6:
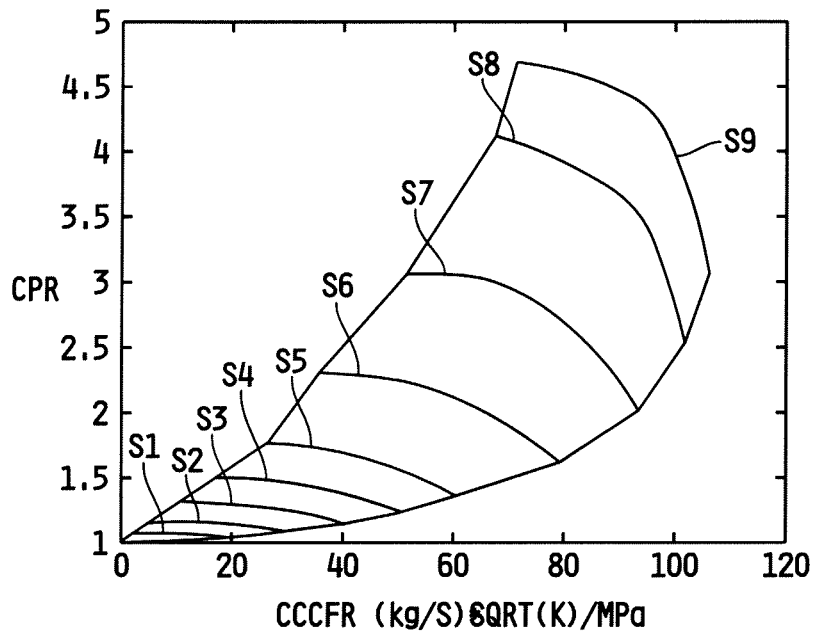
FIG. 6 is a plot of one illustrative example of the compressor pressure ratio map illustrated in FIG. 5.

Referring now to FIG. 6, an example of one such compressor pressure ratio map is shown. In the illustrated embodiment, the compressor pressure ratio map maps compressor corrected compressor flow rate values, CCCFR, to compressor pressure ratio values, CPR, at a plurality of different turbocharger operating speeds, where the contours $S_1$-$S_9$ represent lines of different, constant turbocharger operating speeds. With the compressor pressure ratio map, any one value of CCCFR thus produces a number, M, of different compressor pressure ratio, CPR, and turbocharger operating speed, TS, pairs (CPR, TS)$_1$, . . . , (CPR, TS)$_M$, where M may be any positive integer.

Referring again to FIG. 5, the target compressor pressure ratio, TCR, produced by the functional block 170 and the number of pairs of compressor pressure ratio and turbocharger operating speed values, (CPR, TS)$_{1-M}$, produced by the functional block 176 are provided as inputs to another functional block 172. The functional block 172 processes a function of at least two of the (CPR, TS)$_{1-M}$ pair values and the TCR value to produce a compressor-corrected turbocharger speed estimate, CCTS. In one embodiment, for example, two of the (CPR, TS)$_{1-M}$ pair values are selected with one pair having a CPR value that is less than TCR and the other pair having a CPR value that is greater than TCR, and a conventional interpolation technique is used to determine a CCTS value that corresponds to TCR. In embodiments in which the function of the two (CPR, TS)$_{1-M}$ pair values is linear, or can be acceptably approximated by a linear function, a conventional linear interpolation technique may be used to determine CCTS. Alternatively, in embodiments in which the function of the two (CPR, TS)$_{1-M}$ pair values is non-linear, a conventional non-linear interpolation technique may be used to determine CCTS.

In another example embodiment, the functional block 172 may be configured to process the number of (CPR, TS)$_{1-M}$ pair values to generate a continuous or piece-wise continuous profile of compressor-corrected turbocharger operating speeds as a function of compressor pressure ratios. The profile may illustratively be linear or non-linear. In this embodiment, the functional block 172 is then operable to map TCR to CCTS using the generated profile. It will be appreciated that one or more other conventional processing techniques may alternatively be used to process the number of (CPR, TS)$_{1-M}$ pair values and TCR to determine CCTS, and any such alternate processing techniques are contemplated by this disclosure.

The compressor model 152 illustrated in FIG. 5 further includes another functional block 178 that receives as inputs the compressor inlet temperature signal, CIT, and the compressor corrected turbocharger speed estimate, CCTS, and produces as an output an estimate of the target turbocharger speed, TTS. Illustratively, the functional block 178 processes CIT and CCTS according to a function F3 to produce an estimate of the target turbocharger speed, TTS, and in one illustrative embodiment the function F3 is given by the equation TTS=CCTS*SQRT(CIT/$T_{STD}$), where $T_{STD}$ is as described herein above.

The compressor corrected compressor flow rate, CCCFR, produced by the functional block 174 is also provided as an input to another functional block 180 that illustratively has stored therein a conventional efficiency map corresponding to the specific configuration of the turbocharger 18. Generally, the compressor efficiency map is designed to map values of CCCFR to compressor efficiency (percentage) values at a plurality of different turbocharger operating speeds. The functional block 180 is illustratively operable to process CCCFR using the compressor efficiency map to generate a number of pairs of compressor pressure ratio and turbocharger operating speed values.

Figure 7:
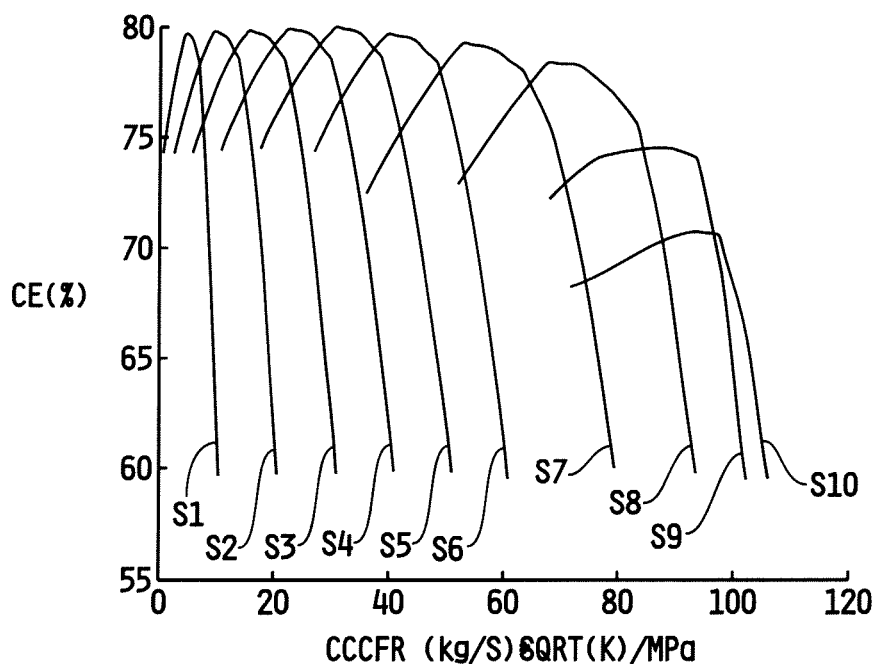
FIG. 7 is a plot of one illustrative example of the compressor efficiency map illustrated in FIG. 5.

Referring now to FIG. 7, an example of one such compressor efficiency map is shown. In the illustrated embodiment, the compressor efficiency map maps compressor corrected compressor flow rate values, CCCFR, to compressor efficiency values, CE, at a plurality of different turbocharger operating speeds, where the contours $S_1$-$S_{10}$ represent lines of different, constant turbocharger operating speeds. With the compressor pressure ratio map, any one value of CCCFR thus produces a number, K, of different compressor efficiency, CE, and turbocharger operating speed, TS, pairs (CE, TS)$_1$, . . . , (CE, TS)$_K$, where K may be any positive integer.

Referring again to FIG. 5, the compressor corrected turbocharger speed, CCTS, produced by the functional block 172 and the number of pairs of compressor efficiency and turbocharger operating speed values, (CE, TS)$_{1-K}$, produced by the functional block 160 are provided as inputs to another functional block 182. Similarly to the functional block 172, the functional block 182 processes a function of at least two of the (CE, TS)$_{1-K}$ pair values and the CCTS value to produce a compressor corrected turbocharger torque estimate, CCTT. In one embodiment, for example, two of the (CE, TS)$_{1-K}$ pair values are selected with one pair having a TS value that is less than CCTS and the other pair having a TS value that is greater than CCTS, and a conventional interpolation technique is used to determine a CCTT value that corresponds to CCTS. In embodiments in which the function of the two (CE, TS)$_{1-K}$ pair values is linear, or can be acceptably approximated by a linear function, a conventional linear interpolation technique may be used to determine CCTT. Alternatively, in embodiments in which the function of the two (CE, TS)$_{1-K}$ pair values is non-linear, a conventional non-linear interpolation technique may be used to determine CCTT. Alternatively still, the functional block 182 may be configured to process the number of (CE, TS)$_{1-K}$ pair values to generate a continuous or piece-wise continuous profile of compressor-corrected turbocharger operating torques as a function of compressor efficiencies, and such a profile can be processed as described above with respect to the functional block 172 to determine CCTT.

Referring again to FIG. 5, the compressor model 152 further includes another functional block 184 that receives as inputs the compressor inlet temperature signal, CIT, and the compressor corrected turbocharger torque estimate, CCTT, and produces as an output an estimate of the target compressor torque, TCT. Illustratively, the functional block 184 processes CIT and CCTT according to a function F4 to produce an estimate of the target compressor torque, TCT, and in one illustrative embodiment the function F4 is given by the equation TCT=CCTT*SQRT(CIT/$T_{STD}$), where $T_{STD}$ is as described herein above.

Figure 8:
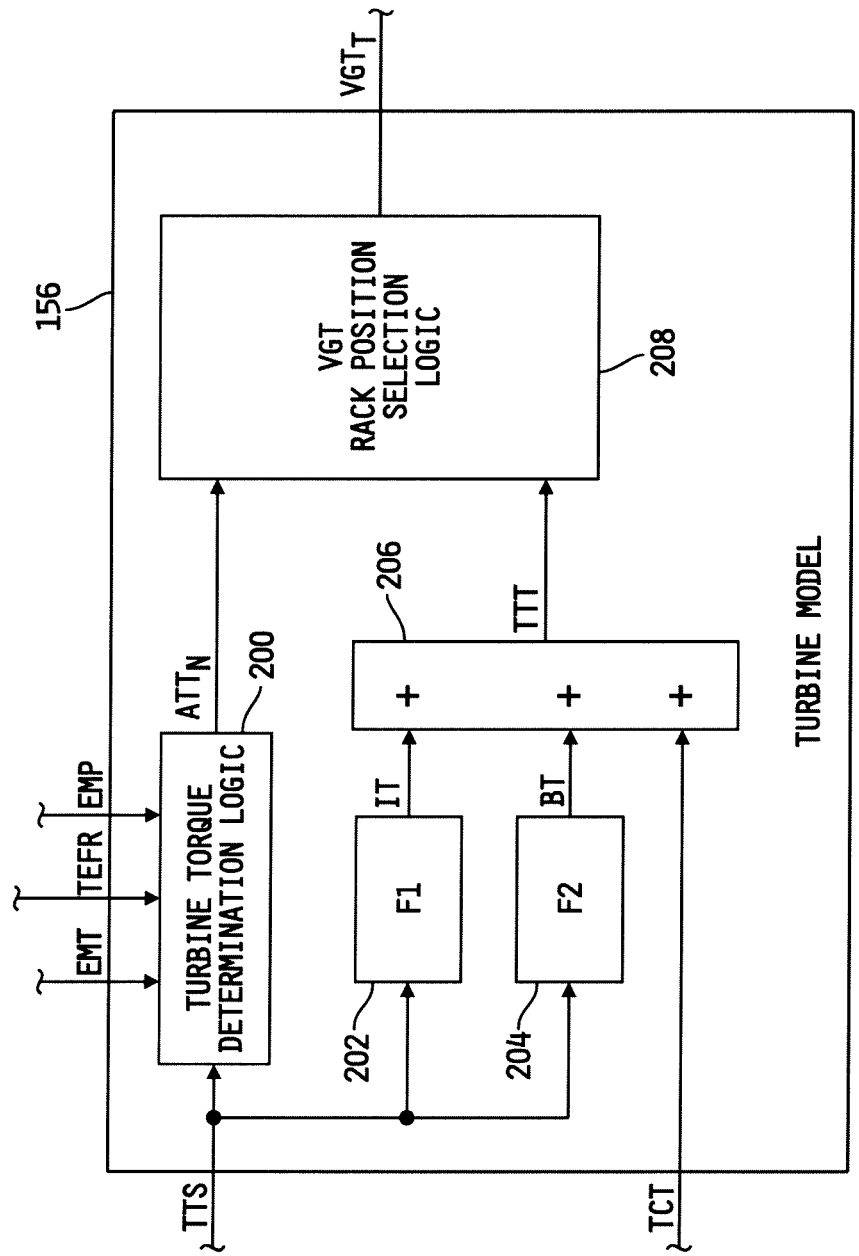
FIG. 8 is a block diagram of one illustrative embodiment of the turbine model illustrated in FIG. 4.

Referring now to FIG. 8, one illustrative embodiment of the turbine model 156 illustrated in FIG. 4 is shown. In the illustrated embodiment, the turbine model 156 includes a turbine torque determination logic block 200 receiving as inputs the target turbocharger speed value, TTS, produced by the compressor model 152, the target exhaust manifold temperature, EMT and the target exhaust manifold pressure, EMP, produced by the cylinder model 154, and a target exhaust flow rate value, TEFR. Illustratively, TEFR may be determined as a conventional function of the target exhaust manifold pressure, EMT, produced by the cylinder model 154, and/or as a function of the target charge flow rate, TCHFR, and the target EGR flow rate, TEGRFR, produced by the combustion parameter to air handling reference generation model 150. In any case, the turbine torque determination logic 200 is operable to process TTS, TEFR. EMT and EMP and produce a number, N, of available turbine torque values, ATT$_N$, wherein each of the N ATT values corresponds to an available turbine torque at a different one of N possible rack positions, i.e., ATT$_1$ corresponds to an available turbine torque at rack position 1, ATT$_2$ corresponds to a different available turbine torque at rack position 2, etc.

Figure 9:
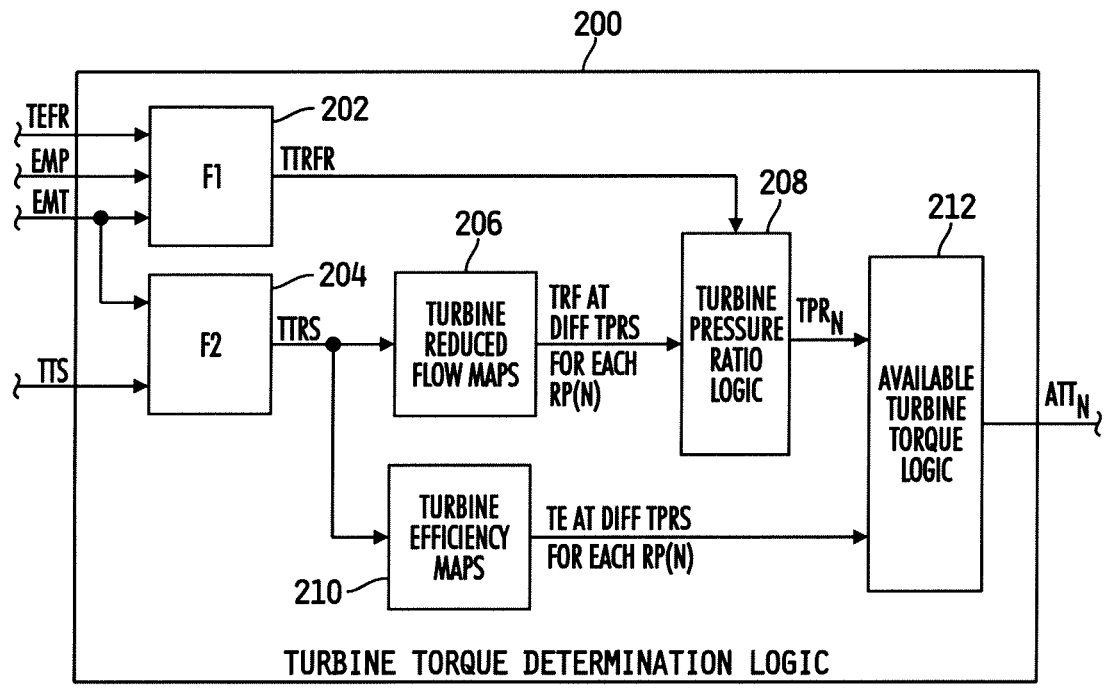
FIG. 9 is a block diagram of one illustrative embodiment of the turbine torque determination logic block illustrated in FIG. 8.

Referring now to FIG. 9, one illustrative embodiment of the turbine torque determination logic block 200 illustrated in FIG. 8 is shown. In the illustrated embodiment, the turbine torque determination logic block 200 includes a function block 202 receiving as inputs the target exhaust flow rate, TEFR, the target exhaust manifold pressure, EMP, and the exhaust manifold temperature, EMT, and producing as an output a target turbine reduced flow rate, TTRFR. Illustratively, the function, F1, stored in the function block 202 produces TTRFR in accordance with the equation TTRFR=TEFR*SQRT(EMT)/EMP. The turbine torque determination logic block 200 further includes another function block 204 receiving as inputs the target exhaust manifold temperature, EMT, and the target turbocharger speed, TTS, and produces as an output a target turbine reduced speed, TTRS. Illustratively, the function, F2, stored in the function block 204 produces TTRS in accordance with the equation TTRS=TTS/SQRT(EMT). Alternatively, this disclosure contemplates other embodiments in which F1 and/or F2 includes more, fewer and/or different input parameters.

The target turbine reduced speed, TTRS, is provided as an input to another functional block 206 that illustratively has stored therein N conventional turbine reduced flow maps corresponding to the specific configuration of the turbocharger 18. Generally, each of the turbine reduced flow maps is designed to map, for a different rack position, TTRS to turbine reduce flow rate values, TRF, at a plurality of different turbine pressure ratios (TPRS). The functional block 206 is illustratively operable to process TTRS using the N turbine reduced flow maps to generate for each rack position a number of pairs of turbine reduced flow and turbine pressure ratio values.

Figure 10:
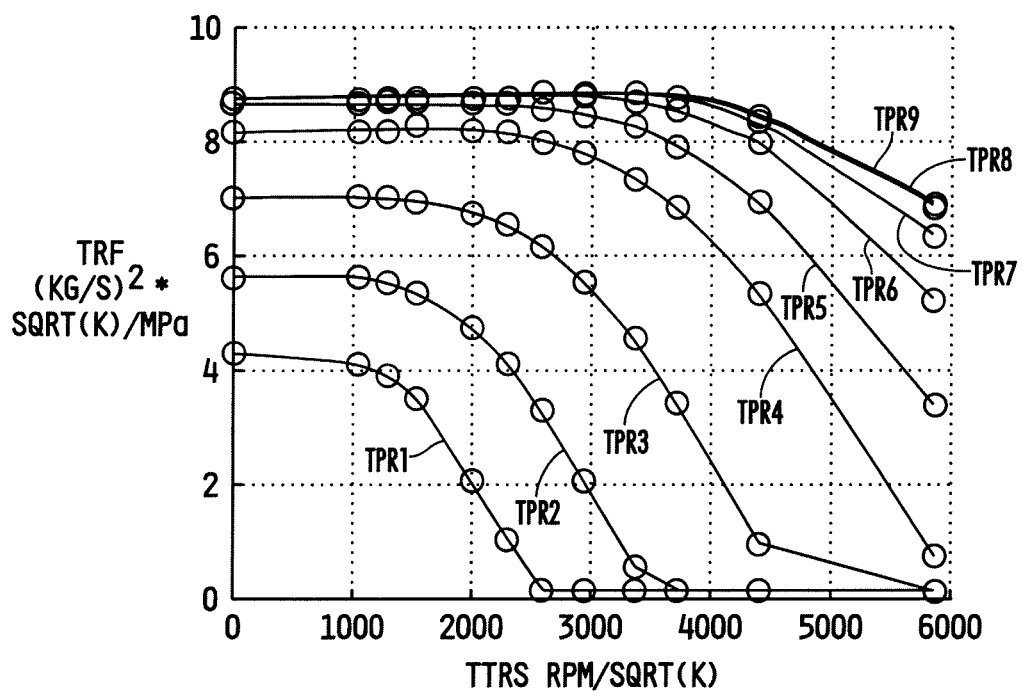
FIG. 10 is a plot of one illustrative example of one of the turbine reduced flow maps illustrated in FIG. 9.

Referring now to FIG. 10, an example of one such turbine reduced flow map is shown for one example rack position of the variable geometry turbine 24. In the illustrated embodiment, the turbine reduced flow map maps target turbine reduced speed values, TTRS, to turbine reduced flow values, TRF, at a plurality of different turbine pressure ratios, where the contours TPR1-TPR represent lines of different, constant turbine pressure ratios. With the turbine reduced flow map, any one value of TTRS thus produces a number, M, of different turbine reduced flow, TRF, and turbine pressure ratio, TPR, pairs $(TRF, TPR)_1, \ldots, (TRF, TPR)_M$, where M may be any positive integer.

Referring again to FIG. 9, the target turbine reduced flow rate, TTRFR, produced by the functional block 202 and the number of pairs of turbine reduced flow and turbine pressure ratio values, $(TRF, TPR)_{1-M}$, produced by the functional block 206 are provided as inputs to another functional block 208. The functional block 208 illustratively processes a function of at least two of the $(TRF, TPR)_{1-M}$ pair values and the TTRFR value to produce a number, N, of turbine pressure ratios; one for each of the N different rack positions. In one embodiment, for example, for each different rack position two of the $(TRF, TPR)_{1-M}$ pair values are selected with one pair having a TFR value that is less than TTRFR and the other pair having a TFR value that is greater than TTFR, and a conventional interpolation technique is used to determine a TPR value that corresponds to TCR for that rack position. In embodiments in which the function of the two $(TRF, TPR)_{1-M}$ pair values is linear, or can be acceptably approximated by a linear function, a conventional linear interpolation technique may be used to determine the N TPR values. Alternatively, in embodiments in which the function of the two $(TRF, TPR)_{1-M}$ pair values is non-linear, a conventional non-linear interpolation technique may be used to determine the N TPR values. Alternatively still, the functional block 316 may be configured to process the number of $(TRF, TPR)_{1-M}$ pair values to generate a continuous or piece-wise continuous profile of TPR values as a function of TRF, and such a profile can be processed as described above with respect to the functional block 172 to determine a TPR for each of the N different rack positions.

The target turbine reduced speed, TTRS, produced by the functional block 204 is also provided as an input to another functional block 210 that illustratively has stored therein a number, N, of conventional turbine efficiency maps corresponding to the specific configuration of the turbocharger 18. Generally, each of the N turbine efficiency maps is designed to map, for each of the N different turbine rack positions, values of TTRS to turbine efficiency (percentage) values at a plurality of different turbine pressure ratio values. The functional block 210 is illustratively operable to process TTRS using the N different turbine efficiency maps to generate for each of the N different rack positions a number of pairs of turbine efficiency and turbine pressure ratio values.

Figure 11:
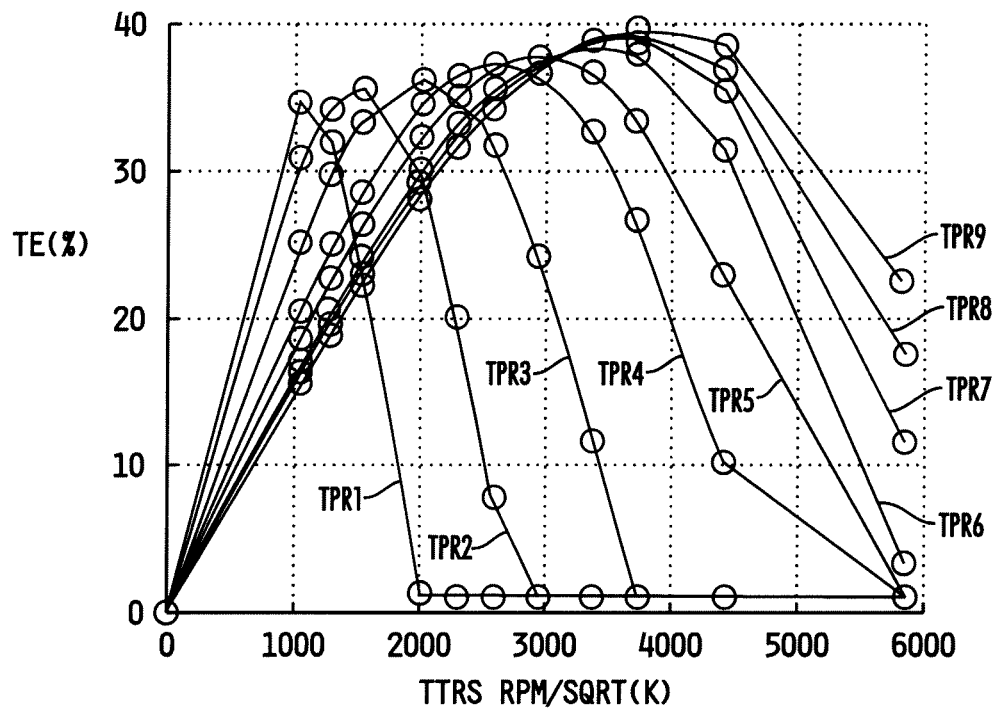
FIG. 11 is a plot of one illustrative example of one of the turbine efficiency maps illustrated in FIG. 9.

Referring now to FIG. 11, an example of one such turbine efficiency map is shown for one example rack position of the variable geometry turbine 24. In the illustrated embodiment, the turbine efficiency map maps target turbine reduced speed values, TTRS, to turbine efficiency values, TE, at a plurality of different turbine pressure ratios, where the contours TPR1-TPR9 represent lines of different, constant turbine pressure ratios. With the N turbine efficiency maps, any one value of TTRS thus produces a number, K, of different turbine efficiency, TE, and turbine pressure ratio, TPR, pairs $(TE, TPR), \ldots, (TE, TPR)_K$, for each of the N different rack positions where K may be any positive integer.

Referring again to FIG. 9, the N turbine pressure ratio values, TPR, produced by the functional block 208 and the number of pairs of turbine efficiency and turbine pressure ratio values, $(TE, TPR)_{1-K}$, produced by the functional block 210 for each of the N different rack positions are provided as inputs to another functional block 212. Similarly to the functional block 208, the functional block 212 processes a function of at least two of the $(TE, TPR)_{1-K}$ pair values and the TPR value for each of the N different rack positions to produce an available turbine torque estimate, ATT, for each of the N different turbine rack positions. In one embodiment, for example, for each rack position two of the $(TE, TPR)_{1-K}$ pair values are selected with one pair having a TPR value that is less than the corresponding TPR value produced by the logic block 208 and the other pair having a TPR value that is greater than the TPR value produced by the logic block 208, and a conventional interpolation technique is used to determine a corresponding ATT value. In embodiments in which the function of the two $(TE, TPR)_{1-K}$ pair values is linear, or can be acceptably approximated by a linear function, a conventional linear interpolation technique may be used to determine the ATT values. Alternatively, in embodiments in which the function of the two $(TE, TPR)_{1-K}$ pair values is non-linear, a conventional non-linear interpolation technique may be used to determine the ATT values. Alternatively still, the functional block 212 may be configured to process the number of $(TE, TPR)_{1-K}$ pair values to generate a continuous or piece-wise continuous profile of available turbine torque values as a function of turbine efficiencies, and such a profile can be processed as described above with respect to the functional block 172 to determine ATT values for each of the N different turbine rack positions.

Referring again to FIG. 8, the turbine model 156 further includes a functional block 202 receiving the target turbocharger speed, TTS, as an input and producing as an output an inertia torque value, IT. Illustratively, IT corresponds to torque associated with the inertia of the rotating turbocharger shaft 30, and F1 illustratively determines IT as a function of TTS. In one illustrative embodiment, for example, F1 computes IT in accordance with the equation IT=I dTTS/dt, where I is the inertia associated with the rotation of the turbocharger shaft 30. Illustratively, I is a constant determined in a conventional manner as a function of the dimensions and structure of the shaft 30.

Figure 12:
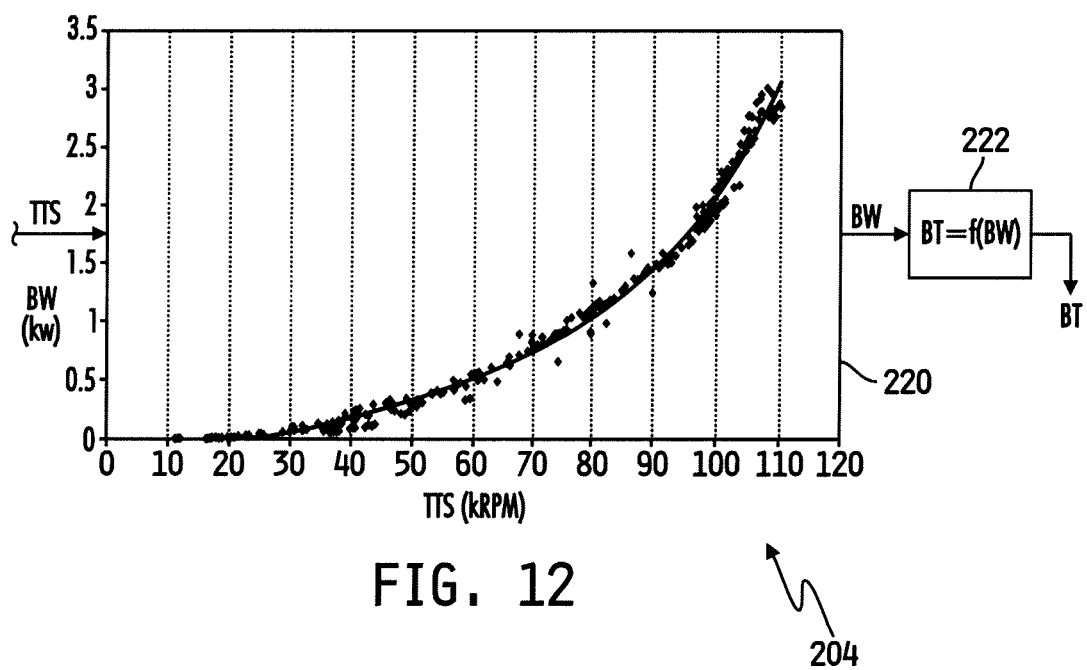
FIG. 12 is a block diagram of one illustrative embodiment and example of the function block F2 illustrated in FIG. 8.

The turbine model 156 further includes another functional block 204 receiving the target turbocharger speed, TTS, as an input and producing as an output a bearing torque value, BT. Illustratively, BT corresponds to torque associated with the bearing housing of the turbocharger 18, and F2 illustratively determines BT as a function of TTS. Referring to FIG. 12, one illustrative embodiment of the functional block 204 is shown. In the illustrated embodiment, the functional block 204 includes a turbocharger bearing work map 220 that maps the target turbine speed, TTS, to a bearing work value, BW. The bearing work value, BW, corresponding to the target turbine speed, TTS, is provided as an input to another functional block 222 that computes the bearing torque value, BT, as a function of the bearing work value, BW, provided by the map 220. In one illustrative embodiment, the functional relationship between BT and BW is given by the relationship $BT = a + b*BW + c*BW^2 + d*BW^3$, where a, b, c and d are calibratible constants. It will be understood, however, that this disclosure contemplates other relationships defining BT as a function of BW and/or that define BT as a function of TTS.

Referring again to FIG. 8, the torque values IT and BT are provided, along with the target compressor torque, TCT, to separate additive inputs of an addition block 206 such that the output of the addition block represents a total target torque, TTT=CTT+IT+BT, which is required to drive the compressor with the target compressor torque. The total target torque, TTT, is provided as one input to a VGT rack position selection logic block 208 and the N available turbine torque values, $ATT_N$, are provided to another input of the block 208. The logic block 208 is generally operable to select in a conventional manner a turbine rack position that has sufficient available torque to satisfy TTT. The logic block 208 is then operable to control $VGT_T$ to select that turbine rack position.

Figure 13:
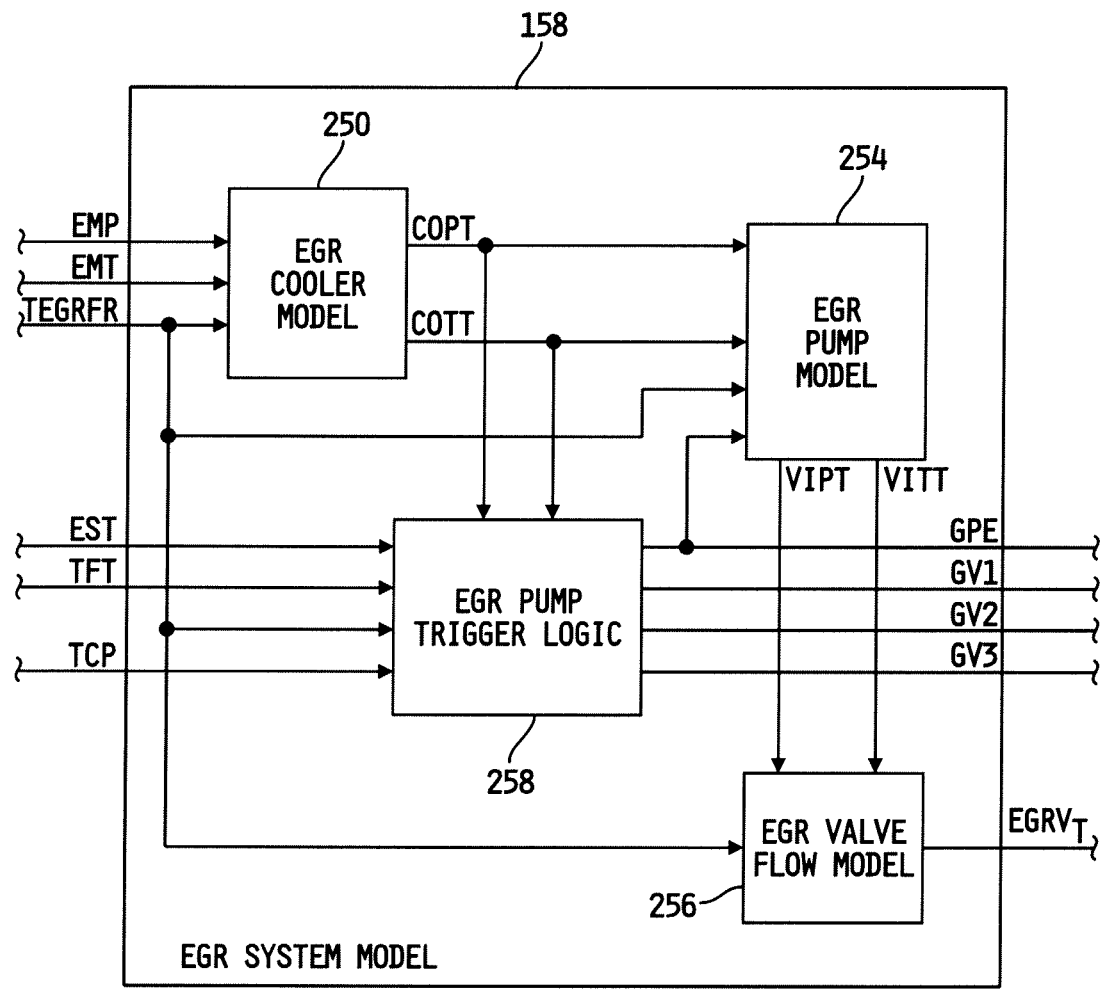
FIG. 13 is a block diagram of one illustrative embodiment of the EGR system model illustrated in FIG. 4.

Referring now to FIG. 13, one illustrative embodiment of the EGR system model 158 illustrated in FIG. 4 is shown. In the illustrated embodiment, the EGR system model 158 includes an EGR cooler model 250, which illustratively contains pressure and temperature models for estimating the outlet pressure and temperature respectively of the EGR cooler 36, an EGR pump model 254, which illustratively contains a model of the electronic gas pump 42, an EGR valve flow model 256, which illustratively contains a flow model of the EGR valve 38, and an EGR pump trigger logic block 258. The EGR cooler model 250 receives as inputs the exhaust manifold pressure target, EMP, and the exhaust manifold temperature target, EMT, produced by the cylinder model 154 of FIG. 4, and the target EGR flow rate value, TEGRFR, produced by the reference generation model 150, and processes these input values to produce estimated target values of the EGR cooler outlet pressure, COPT, and the EGR cooler outlet temperature, COTT. In one illustrative embodiment, the EGR cooler model estimates the target EGR cooler outlet pressure, COPT, according to the equation COPT=EMP+a1*TEGRFR+a2*TEGRFR$^2$, where a1 and a2 are calibration coefficients, although this disclosure contemplates that COPT may alternatively be estimated using one or more other equations and/or using more or fewer parameters. The EGR cooler model illustratively further estimates the target EGR cooler outlet temperature, COTT, according to the equation COTT=EMT*[1−(b0+b1*TEGRFR+b2*TEGRFR$^2$)]+T$_{cool}$*(b0+b1*TEGRFR+b2*TEGRFR$^2$), where T$_{cool}$ is a measured or estimated value of the engine coolant, which is illustratively provided by the embedded models block 110 of FIG. 3, and b0, b1 and b2 are calibration constants, although this disclosure contemplates that COTT may alternatively be estimated using one or more other equations and/or using more or fewer parameters.

The EGR pump model 254 receives as inputs the EGR cooler outlet pressure and temperature targets, COPT and COTT respectively, which given the location of the pump 42 correspond to the gas pump inlet pressure and temperature respectively, the target EGR flow rate, TEGRFR, and the gap pump enable value, GPE, produced by the EGR pump trigger logic 258, and processes these values to produce gas pump outlet pressure and temperature values, which given the location of the pump 42 correspond to an EGR valve inlet pressure target, VIPT, and an EGR valve inlet temperature target, VITT, respectively. In one illustrative embodiment, the target outlet pressure of the electronic gas pump 42, which is the EGR valve inlet pressure target, VIPT, is estimated by the EGR pump model 254 according to the equation VIPT=COPT*PR, where PR is the pressure ratio of the electronic gas pump 42 and is modeled by the equation PR={[(a*W$_R$)/TEGRFR*C$_P$*COTT$^2$]+1}$^{y/y+1}$, and W$_R$ is the rated power of the electronic gas pump 42, C$_P$ is the specific heat capacity of the recirculated exhaust gas and y is the specific heat ratio, although this disclosure contemplates that VIPT may alternatively be estimated using one or more other equations and/or using more or fewer parameters. Illustratively, the target outlet temperature of the electronic gas pump 42, which is the EGR valve inlet temperature target, VITT, is estimated by the EGR pump model 254 according to the equation VITT=COTT*[1+(PR$^{y-1/y}$−1)/η], where η is the efficiency of the electronic gas pump 42, although this disclosure contemplates that VITT may alternatively be estimated using one or more other equations and/or using more or fewer parameters.

The EGR valve flow model 256 receives as inputs the EGR valve inlet pressure and temperature targets, VIPT and VITT respectively, as well as the target EGR flow rate, TEGRFR, and processes these values to produce the EGR valve target value, EGRV$_T$, in the form of a minimum geometric, or throat, area, A$_T$, of the EGR valve 38. Illustratively, the EGR valve flow model 256 contains two separate models for determining EGRV$_T$; one that computes EGRV$_T$ under sub-critical flow conditions and one that computes EGRV$_T$ under choked flow operating conditions. In one illustrative embodiment, the EGR valve flow model 256 computes EGRV$_T$ under sub-critical flow conditions according to the equation EGRV$_T$=A$_T$=A/{1+SQRT[2*(1+K)]}, where A is the cross-sectional area of the EGR passageway 34 and K is a parameter that denotes a normalized area term. In one embodiment, K is given by the equation K=P1*(P1−P3)*A$^2$/TEGRFR*VITT*R, where P1 is the EGR valve inlet static pressure, P3 is the EGR valve outlet static pressure and R is the gas constant. Under choked flow operating conditions, the EGR valve flow model 256 illustratively computes EGRV$_T$ according to the equation EGRV$_T$=A$_T$=TEGRFR*[SQRT(R*T$_0$)]/C$_D$*p$_0$*y$^{1/2}$*[2/(y+1)]$^{(y+1)/2(Y-1)}$), where T$_0$ is the stagnation temperature, C$_D$ is the discharge coefficient and p$_0$ is the stagnation pressure upstream of the EGR valve 38. It will be understood that this disclosure contemplates alternate embodiments in which one or both of the foregoing equations is replaced by one or more other equations for determining EGRV$_T$ and/or is modified to include more or fewer parameters.

Figure 14:
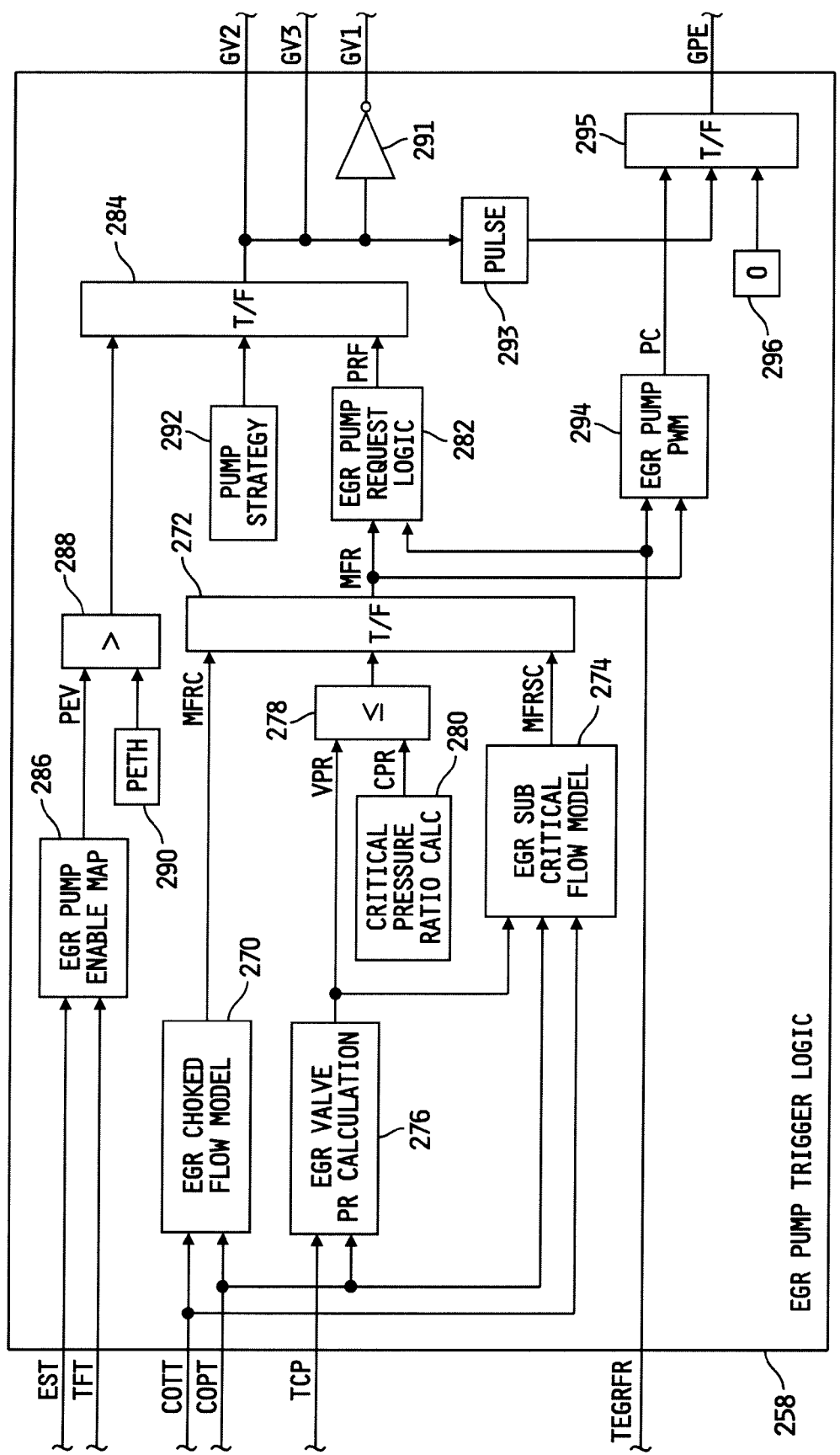
FIG. 14 is a block diagram of one illustrative embodiment of the EGR pump trigger logic model illustrated in FIG. 13.

The EGR pump trigger logic 258 receives as inputs the engine speed target, EST, the total fueling target, TFT, the target charge pressure, TCP, the EGR cooler outlet pressure target, COPT, and the EGR cooler outlet temperature target, COTT, and processes these values to produce the gas pump enable value, GPE, and the gas valve control values GV1, GV2 and GV3. Referring now to FIG. 14, one illustrative embodiment of the EGR pump trigger logic 258 is illustrated. In the illustrated embodiment, the EGR pump trigger logic 258 includes an EGR choked flow model block 270 receiving as inputs the EGR cooler outlet pressure and temperature targets, COPT and COTT respectively, and produces as an output a maximum EGR flow rate target under choked operating conditions, MFRC. In one illustrative embodiment, the EGR choked flow model 270 produces MFRC according to the equation MFRC=60*{EDC*(MOA*10$^{-6}$)*(COPT*10$^3$)*SQRT(SHR)*[(SHR+1)/2(SHR−1)]$^{2/SHR+1}$}/SQRT[EGC*(COTT+273)], where EDC is an EGR discharge coefficient, MOA is the maximum EGR orifice area, SHR is the EGR specific heat ratio, and EGC is the EGR gas constant, although this disclosure contemplates that MFRC may alternatively be estimated using one or more other equations and/or using more or fewer parameters. In any case, MFRC is provided as the "true" input of a true/false block 272.

The EGR pump trigger logic 258 further includes an EGR sub critical flow model 274 receiving as inputs the EGR cooler outlet pressure and temperature targets, COPT and COTT respectively, and an EGR valve pressure ratio value, VPR, computed by an EGR valve pressure ratio calculation block 276, and processes these values to produce as an output a maximum EGR flow rate target under sub-critical flow conditions, MFRSC. In one illustrative embodiment, the EGR sub-critical flow model 274 produces MFRSC according to the equation MFRSC=60*SQRT{[(COPT*10$^3$)*((COPT−(VPR*COPT))*10$^3$*[(MAX(MOA, EPA)*10$^{-6}$]$^2$]/[EGC*(COTT+273)*[(COPT/MAX(VPR*COPT, 1)−0.5+EPA/MOA*EGC−0.5*(EPA/MOA*EGC)$^2$]], where EPA is the cross sectional area of the EGR passageway 34, although this disclosure contemplates that MFRSC may alternatively be estimated using one or more other equations and/or using more or fewer parameters. In any case, MFRSC is provided as the "false" input to the true/false block 272.

The EGR valve pressure ratio calculation block 276 receives as inputs the EGR cooler outlet pressure target, COPT, and the target charge pressure, TCP, and produces the EGR valve pressure ratio target value, VPR. In one illustrative embodiment, the EGR valve pressure ratio calculation block 276 produces VPR according to the equation VPR=MIN (TCP/MAX(COPT, 1), 1), although this disclosure contemplates that VPR may alternatively be estimated using one or more other equations and/or using more or fewer parameters. In any case, VPR is provided as a high-side input to a "less than or equal to" block 278, and the low-side input of the "less than or equal to" block 278 receives a critical pressure ratio value, CPR, produced by a critical pressure ratio calculation block 280. In one illustrative embodiment, the critical pressure ratio calculation block produces CPR according to the equation $CPR=[SHR/(SHR-1)]^{SHR/(SHR+1)}$, where SHR is the EGR specific heat ratio, although this disclosure contemplates that CPR may alternatively be estimated using one or more other equations and/or using more or fewer parameters. In any case, the output of the "less than or equal to" block is provided as the control input to the true/false block 272. If the EGR valve pressure ratio, VPR, corresponding to the target ratio of pressure across the EGR valve 38, is greater than the critical pressure ratio, CPR, the true/false block 272 produces as the maximum EGR flow rate, MFR, the maximum EGR flow rate target under choked conditions, MFRC. If, on the other hand, the EGR valve pressure ratio, VPR, exceeds the critical pressure ratio, CPR, the maximum EGR flow rate, MFR, is the maximum EGR flow rate target under sub-critical flow conditions, MFRSC. In any case, the maximum EGR flow rate value, MFR, represents the maximum achievable EGR flow rate through the EGR valve 38 and the EGR passageway 34 with the EGR valve in the fully open position and without activating the electric gas pump 42.

Figure 15:
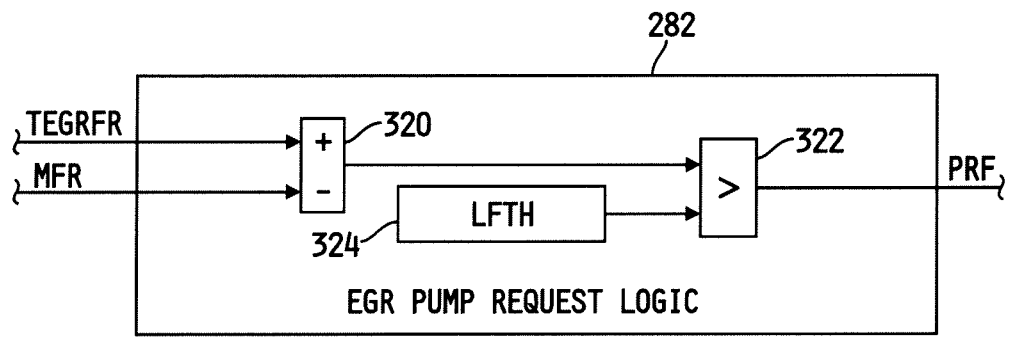
FIG. 15 is a block diagram of one illustrative embodiment of the EGR pump request logic model illustrated in FIG. 14.

The EGR pump trigger logic 258 further includes an EGR pump request logic block 282 that receives as inputs the maximum EGR flow rate target, MFR, and the target EGR flow rate, TEGRFR, and processes these inputs to produce an EGR pump request flag, PRF, that is supplied as the "false" input to another true/false block 284. Referring now to FIG. 15, one illustrative embodiment of the EGR pump request logic 282 is shown. In the illustrated embodiment, the EGR pump request logic 282 includes a summation node 320 receiving TEGRFR at an additive input and receiving MFR at a subtractive input. The difference, TEGRFR−MFR represents an EGR pump request value and is supplied to a high-side input of a "greater than" block 322 having a low-side input receiving a low EGR flow threshold value, LFTH. If the difference between the target EGR flow rate, TEGRFR, and the maximum EGR flow rate, MFR, i.e., the pump request value, is greater than LFTH, the output, PRF, of the EGR pump request logic 282 is "1" and is otherwise zero.

Referring again to FIG. 14, the EGR pump trigger logic 258 further includes an EGR pump enable map 286 that receives as inputs the engine speed target, EST, and the total fueling target, TFT, and processes these inputs to produce a pump enable value, PEV. Illustratively, the map 286 monitors EST and TFT and produces PEV of increasing value as a transient increase in EST, TFT or a combination thereof is/are detected. PEV is provided as a high-side input to a "greater than" block 288 having a low-side input receiving a pump enable threshold, PETH stored in a memory location 290. The output of the "greater than" block 288 is provided as the "true" input to the true/false block 284 such that the "true" input is "1" if PEV>PETH. The pump enable threshold value, PETH, is illustratively set at a value such that PEV represents a significant or sufficiently large transient increase in EST and/or TFT if PEV>PETH. Otherwise, the output of the block 288 is zero.

The control input of the true/false block 284 receives a pump strategy value produced by a pump strategy block 292. Illustratively, the pump strategy value is set to "1" if the currently desired EGR flow rate, i.e., the target EGR flow rate, TEGRFR, is less than the maximum achievable EGR flow rate, MFR, i.e., if the target EGR flow rate, TEGRFR, is less than the current maximum achievable EGR flow rate with the EGR valve 38 in the fully open position and without activating the electric gas pump 42. In such cases, the true/false block 284 selects as its output the output of the "greater than" block 288, which is a "1" if the pump enable value, PEV, produced by the EGR pump enable map 286 exceeds the pump enable threshold value, PETH, and is otherwise zero. The pump strategy value in the block 292 is otherwise set to zero if the currently desired EGR flow rate, i.e., the target EGR flow rate, TEGRFR, is greater than the maximum achievable EGR flow rate, MFR, i.e., if the target EGR flow rate, TEGRFR, is greater than the current maximum achievable EGR flow rate with the EGR valve 38 in the fully open position and without activating the electric gas pump 42. In such cases, the true/false block 284 selects as its output the output of the EGR pump request logic block 282, which is the pump request flag, PRF. As long as the difference between TEGRFR and MFR is greater than the low flow threshold value, LFTH, the pump request flag, PRF, and thus the output of the true/false block 184, will be "1." If the difference between TEGRFR and MFR does not exceed LFTH, however, PRF and the output of the true/false block 284 will be zero. Those skilled in the art will recognize other pump strategies that may be used in addition to or alternatively to the foregoing pump strategy, and any such additional or alternative pump strategies are contemplated by this disclosure.

Figure 16:
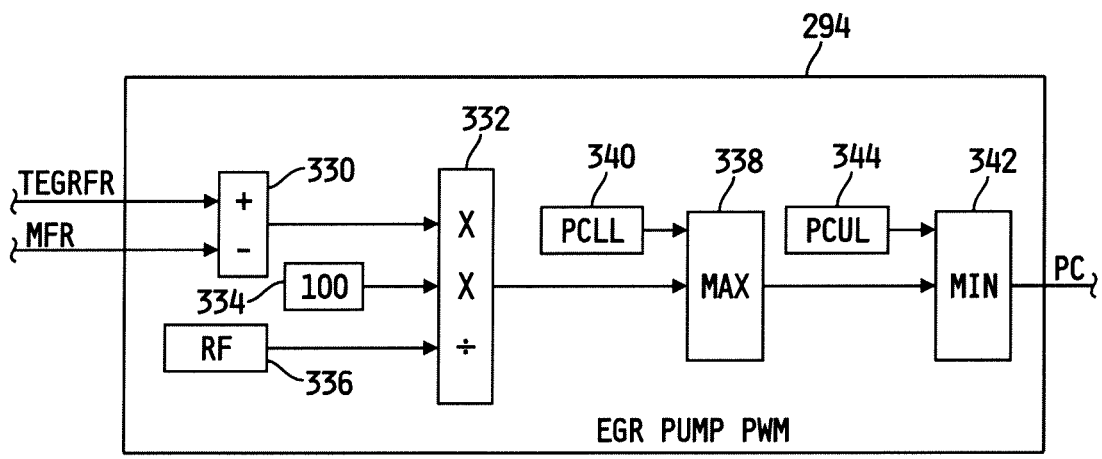
FIG. 16 is a block diagram of one illustrative embodiment of the EGR pump PWM model illustrated in FIG. 14.

The output of the true/false block 284 is provided to a pulse block 293. If the input to the pulse block 293 is zero, the output of the pulse block 293 will also be zero. If instead the input to the pulse block 293 is "1," the output of the pulse block 293 will be a pulse stream. The output of the true/false block 284 is also the gas valve control values GV2 and GV3, and is the input of an inverter 291 producing the gas valve control value GV1 as its output. The output of the pulse block 293 is the control input to another true/false block 295. The "true" input of the true/false block 295 is a pump command value, PC, produced by an EGR pump PWM block 294 receiving as inputs the maximum EGR flow rate, MFR, and the target EGR flow rate, TEGRFR. Referring now to FIG. 16, one illustrative embodiment of the EGR pump PWM block 294 is shown. In the illustrated embodiment, the EGR pump PWN block 294 includes a summation node 330 receiving TEGRFR at an additive input and MFR at a subtractive input, and the output of the summation node 330 is provided to a multiplication input of an arithmetic block 332. Another multiplication input of the block 332 receives the value 100 stored in a memory location 334, and a division input of the block 332 receives an EGR pump rated flow value, RF, stored in a memory location 336. The output of the arithmetic block 332 is 100*(TEGRFR−MFR)/RF, and is provided to one input of a MAX block 338 having another input receiving a pump command lower limit value, PCLL, stored in a memory location 340. The output of the MAX block 338 is provided to one input of a MIN block 342 having another input receiving a pump command upper limit value, PCUL, stored in a memory location 344. Under conditions in which the target EGR flow rate, TEGRFR, exceeds the maximum achievable EGR flow rate, MFR, the pump command, PC, produced by the EGR pump PWM block 294 is thus the value 100*(TEGRFR−MFR)/PRF limited to a maximum value of PCUL and to a minimum value of PCLL. Under other conditions in which the target EGR flow rate, TEGRFR, is less than the maximum achievable EGR flow rate, MFR, the pump command, PC, produced by the EGR pump PWM block 294 is thus the minimum pump command value, PCLL. In alternative embodiments, the block 294 may be configured such that the pump command, PC, produced by the EGR pump PWM block 294 when TEGRFR is less than MFR is the maximum pump command value, PCUL. Referring again to FIG. 14, the "false" input of the true/false block 295 receives the value zero stored in a memory location 296, and the output of the true/false block 295 is the gas pump enable value, GPE.

Under normal operating conditions of the engine 12 and air handling system 10, which conditions are defined for purposes of this disclosure as steady-state operating conditions and transient operating conditions during which PEV does not exceed PETH, the target EGR flow rate, TEGRFR, will be less than the maximum achievable EGR flow rate, MFR, with the EGR valve 38 in the fully open position and without activating the electric gas pump 42. Under such normal operating conditions, the output of the pump strategy block 292 will thus be "1," and the output of the "greater than" block 288 will be zero, such that the output of the true/false block 284, GV2 and GV3 will be zero, whereas the output of GV1 will be "1." The pump enable pulse block 293 will therefore produce an output of zero, and the output of the true/false block 295 will likewise therefore likewise be zero. Under such normal operating conditions, the control circuit 50 will thus disable or deactivate the electric gas pump 42 (GPE=0), close the valves 74 and 78 (GV2=GV3=0) and open the valve 70 (GV1=1). Control of EGR flow rate under such normal operating conditions will thus be carried out in a conventional manner via control of the position, i.e., the cross-sectional flow area, of the EGR valve 38.

If, during such normal operating conditions, a sufficiently high transient event occurs in which EST and/or TFT rapidly increases above a value which causes PEV to be greater than PETH, the output of the "greater than" block 288 will switch to "1," as will the output of the true/false block 284, GV2 and GV3, whereas GV1 will switch to zero. Since TEGRFR will still be less than MFR, at least for some time period, the pump command, PC, produced by the EGR pump PWM block 294 will thus be the lower pump command limit, PCLL. This will cause the gas pump enable value, GPE, to pulse with a PWM percentage determined by PCLL, and will also cause GV2 and GV3 to be "1" and GV3 to be zero. Under such high transient operating conditions, the control circuit 50 will thus enable or activate the electric gas pump 42 and control operation of the electric gas pump 42 to a PWM rate determined by PC=PCLL (GPE=PC), open the valves 74 and 78 (GV2=GV3=0) and close the valve 70 (GV1=1). Recirculated exhaust gas will thus flow from the exhaust passageway 28 through the EGR passageway 34 and the EGR cooler 36, through the exhaust passageways 80, 76 and 72, through the valves 74 and 78 and through the electric gas pump 42 where the electric gas pump 42 is operable to increase the flow rate of exhaust gas through the EGR passageway 34 to the EGR valve 38 above what could otherwise be achieved without the electric gas pump 42.

During off-normal operating conditions during which the target EGR flow rate, TEGRFR, is greater than MFR, i.e., the desired (target) EGR flow rate is greater than the maximum achievable EGR flow rate, MFR, the output of the pump strategy block 292 will be zero, and the output of the true/false block 284 will thus be the pump request flag, PRF. As long as the difference (TEGRFR−MFR) does not exceed the low flow threshold value, LFTH (FIG. 15), PRF will be zero, as will be the output of the true/false block 284 and the electric pump 42 will not be activated as described above under normal operating conditions. If, however, the difference (TEGRFR−MFR) exceeds LFTH, PRF will be "1," as will the output of the true/false block 284. Under such conditions the electric gas pump 42 will be activated as described above during high transient conditions, except under the otherwise off-normal operating conditions TEGRFR>MFR so that the pump command, PC, will have the value 100*(TEGRFR−MFR)/RF, limited to a maximum of PCUL and a minimum of PCLL. Under such off-normal operating conditions, the control circuit 50 will thus enable or activate the electric gas pump 42 and control operation of the electric gas pump to a PWM rate determined by PC=100*(TEGRFR−MFR)/RF, open the valves 74 and 78 (GV2=GV3=0) and close the valve 70 (GV1=1). Recirculated exhaust gas will thus flow from the exhaust passageway 28 through the EGR passageway 34 and the EGR cooler 36, through the exhaust passageways 80, 76 and 72, through the valves 74 and 78 and through the electric gas pump 42 where the electric gas pump 42 is operable to increase the flow rate of exhaust gas through the EGR passageway 34 to the EGR valve 38 above what could otherwise be achieved without the electric gas pump 42.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. An air handling system for an internal combustion engine, comprising:
    an exhaust gas recirculation (EGR) passageway fluidly coupled between an exhaust manifold of the engine via an exhaust gas passageway and an intake manifold of the engine via an intake air passageway,
    an EGR valve disposed in-line with the EGR passageway, the EGR valve controllable between fully closed and fully open positions to control a flow rate of exhaust gas through the EGR passageway from the exhaust manifold to the intake manifold,
    a dedicated electric gas pump for the exhaust gas, that increases, when activated, the flow rate of exhaust gas through the EGR passageway supplied to the intake air passageway, and
    a control circuit including a memory having instructions stored therein that are executable by the control circuit to:
        determine a pump enable value in response to at least one of a target engine speed and a total fueling target and to determine a maximum achievable flow rate of recirculated exhaust gas through the EGR passageway with the EGR valve in the fully open position and with the electric gas pump present and deactivated,
        activate the electric gas pump to increase the flow rate of exhaust gas through the EGR passageway in response to the pump enable value exceeding a threshold pump enable value and a target flow rate of recirculated exhaust gas through the EGR passageway being less than the maximum achievable flow rate; and
        deactivate the electric gas pump in response to the pump enable value being less than the threshold pump enable value.

2. The system of claim 1 further comprising an exhaust gas cooler disposed in-line with the EGR passageway between the exhaust manifold and the EGR valve,
wherein the electric gas pump is fluidly coupled to the EGR passageway between the EGR cooler and the EGR valve.

3. The system of claim 2 wherein the electric gas pump has an exhaust gas inlet and an exhaust gas outlet,
and further comprising:
a first fluid passageway fluidly coupled between the EGR passageway and the exhaust gas inlet of the electric gas pump,
a first control valve disposed in-line with the first fluid passageway, the first control valve controllable between fully closed and fully open positions,
a second fluid passageway fluidly coupled between the EGR passageway and the exhaust gas outlet of the electric pump,
a second control valve disposed in-line with the second fluid passageway, the second control valve controllable between fully closed and fully open positions, and
a third control valve disposed in-line with the EGR passageway between a junction of the first fluid passageway with the EGR passageway and a junction of the second fluid passageway with the EGR passageway, the third control valve controllable between fully closed and fully open positions.

4. The system of claim 3 wherein the instructions stored in the memory further include instructions that are executable by the control circuit to control each of the first and second control valves to fully open positions and to control the third control valve to a fully closed position when activating the electric gas pump.

5. The system of claim 3 wherein the instructions stored in the memory further include instructions that are executable by the control circuit to control each of the first and second control valves to fully closed positions and to control the third control valve to a fully open position when deactivating the electric gas pump.

6. The system of claim 1 wherein the instructions stored in the memory further include instructions that are executable by the control circuit to activate the electric gas pump via a PWM signal.

7. The system of claim 6 wherein the instructions stored in the memory further include instructions that are executable by the control circuit to control a PWM percentage of the PWM signal to a constant percentage value.

8. The system of claim 2 wherein the instructions stored in the memory further include instructions that are executable by the control circuit to determine the maximum achievable flow rate of recirculated exhaust gas by determining a first maximum achievable flow rate of recirculated gas through the EGR passageway with the EGR valve in the fully open position and with the electric gas pump deactivated according to a first EGR flow model, determining a second maximum achievable flow rate of recirculated gas through the EGR passageway with the EGR valve in the fully open position and with the electric gas pump deactivated according to a second EGR flow model different from the first EGR flow model, determining a pressure ratio of the EGR valve, determining a critical pressure ratio value, and selecting as the maximum available flow rate of recirculated exhaust gas as the first maximum available flow rate of recirculated exhaust gas if the pressure ratio of the EGR valve does not exceed the critical pressure ratio value and otherwise selecting as the maximum available flow rate of recirculated exhaust gas as the second maximum available flow rate of recirculated exhaust gas.

9. The system of claim 8 wherein the instructions stored in the memory further include instructions that are executable by the control circuit to determine the pressure ratio of the EGR as a function of a target outlet pressure of the EGR cooler and a target charge pressure, the charge being a combination of fresh air and recirculated exhaust gas supplied to the intake manifold,
and wherein the instructions stored in the memory further include instructions stored in the memory that are executable by the control circuit to determine the first and second maximum available flow rates of recirculated exhaust gas each as a function of the target outlet pressure of the EGR cooler and a target outlet temperature of the EGR cooler.

10. An air handling system for an internal combustion engine, comprising:
an exhaust gas recirculation (EGR) passageway fluidly coupled between an exhaust manifold of the engine via an exhaust gas passageway and the intake manifold of the engine via an intake air passageway,
an EGR valve disposed in-line with the EGR passageway, the EGR valve controllable between fully closed and fully open positions to control a flow rate of exhaust gas through the EGR passageway from the exhaust manifold to the intake manifold,
a dedicated electric gas pump for the exhaust gas, that increases, when activated, the flow rate of exhaust gas through the EGR passageway supplied to the intake air passageway, and
a control circuit including a memory having instructions stored therein that are executable by the control circuit to determine a maximum achievable flow rate of recirculated exhaust gas through the EGR passageway with the EGR valve in the fully open position and with the electric gas pump present and deactivated, and to activate the electric gas pump to increase the flow rate of exhaust gas through the EGR passageway in response to a target flow rate of recirculated exhaust gas through the EGR passageway exceeding the maximum achievable flow rate of recirculated exhaust gas through the EGR passageway.

11. The system of claim 10 wherein the instructions stored in the memory further include instructions that are executable by the control circuit to determine a pump request value as a function of the target flow rate of recirculated exhaust gas through the EGR passageway and the maximum flow rate of recirculated exhaust gas through the EGR passageway, and to activate the electric gas pump only if the target flow rate of recirculated exhaust gas through the EGR passageway is greater than the maximum achievable flow rate of recirculated exhaust gas through the EGR passageway and the pump request value exceeds a low flow threshold.

12. The system of claim 11 wherein the instructions stored in the memory further include instructions that are executable by the control circuit to deactivate the electric gas pump if the pump request value does not exceed the low flow threshold.

13. The system of claim 10 wherein the instructions stored in the memory further include instructions that are executable by the control circuit to activate the electric gas pump via a PWM signal.

14. The system of claim 13 wherein the instructions stored in the memory further include instructions that are executable by the control circuit to determine a PWM percentage value as a function of the target flow rate of recirculated exhaust gas through the EGR passageway and the maximum flow rate of recirculated exhaust gas through the EGR passageway, and to control a PWM percentage of the PWM signal to the PWM percentage value.

15. The system of claim 10 further comprising an exhaust gas cooler disposed in-line with the EGR passageway between the exhaust manifold and the EGR valve,
   wherein the electric gas pump is fluidly coupled to the EGR passageway between the EGR cooler and the EGR valve.

16. The system of claim 15 wherein the electric gas pump has an exhaust gas inlet and an exhaust gas outlet,
   and further comprising:
   a first fluid passageway fluidly coupled between the EGR passageway and the exhaust gas inlet of the electric gas pump,
   a first control valve disposed in-line with the first fluid passageway, the first control valve controllable between fully closed and fully open positions,
   a second fluid passageway fluidly coupled between the EGR passageway and the exhaust gas outlet of the electric pump,
   a second control valve disposed in-line with the second fluid passageway, the second control valve controllable between fully closed and fully open positions, and
   a third control valve disposed in-line with the EGR passageway between a junction of the first fluid passageway with the EGR passageway and a junction of the second fluid passageway with the EGR passageway, the third control valve controllable between fully closed and fully open positions.

17. The system of claim 16 wherein the instructions stored in the memory further include instructions that are executable by the control circuit to control each of the first and second control valves to fully open positions and to control the third control valve to a fully closed position when activating the electric gas pump.

18. The system of claim 17 wherein the instructions stored in the memory further include instructions that are executable by the control circuit to deactivate the electric gas pump if the target flow rate of recirculated exhaust gas through the EGR passageway does not exceed the maximum achievable flow rate of recirculated exhaust gas through the EGR passageway.

19. The system of claim 18 wherein the instructions stored in the memory further include instructions that are executable by the control circuit to control each of the first and second control valves to fully closed positions and to control the third control valve to a fully open position when deactivating the electric gas pump.

* * * * *